United States Patent [19]

Sato et al.

[11] Patent Number: 5,778,260
[45] Date of Patent: Jul. 7, 1998

[54] DEVICE FOR CONTROLLING DEVELOPING OPERATION OF ELECTRO-DEVELOPING TYPE CAMERA

[75] Inventors: Koichi Sato; Masato Okabe; Hironori Kamiyama; Osamu Shimizu; Yuudai Yamashita, all of Tokyo, Japan

[73] Assignees: Asahi Kogaku Kogyo Kabushiki Kaisha; Dai Nippon Printing Co., Ltd., both of Tokyo, Japan

[21] Appl. No.: 654,149

[22] Filed: May 28, 1996

[30] Foreign Application Priority Data

| May 26, 1995 | [JP] | Japan | 7-152602 |
| May 26, 1995 | [JP] | Japan | 7-152603 |
| Jun. 2, 1995 | [JP] | Japan | 7-159806 |
| Apr. 11, 1996 | [JP] | Japan | 8-114230 |
| Apr. 11, 1996 | [JP] | Japan | 8-114231 |
| Apr. 11, 1996 | [JP] | Japan | 8-114232 |

[51] Int. Cl.$^6$ ........................... G03B 17/50
[52] U.S. Cl. ........................... 396/30; 348/221; 348/222
[58] Field of Search ............ 396/30; 399/220; 430/59; 348/207, 220–222; 358/471

[56] References Cited

U.S. PATENT DOCUMENTS

| 5,191,408 | 3/1993 | Takanashi et al. | 358/471 |
| 5,315,410 | 5/1994 | Takanshi et al. | 348/294 |
| 5,408,341 | 4/1995 | Takanashi et al. | 358/471 |
| 5,424,156 | 6/1995 | Aoki et al. | 430/59 |
| 5,631,700 | 5/1997 | Sato | 348/222 |
| 5,708,472 | 1/1998 | Morisawa et al. | 348/220 |

FOREIGN PATENT DOCUMENTS

| 0327236 | 8/1989 | European Pat. Off. |
| 229081 | 1/1990 | Japan |
| 315087 | 1/1991 | Japan |
| 3278342 | 12/1991 | Japan |
| 5-2280 | 1/1993 | Japan |
| 524706 | 4/1993 | Japan |
| 5150251 | 6/1993 | Japan |
| 5165005 | 6/1993 | Japan |
| 6130347 | 5/1994 | Japan |
| 6313894 | 11/1994 | Japan |
| 713132 | 1/1995 | Japan |

*Primary Examiner*—D. Rutledge
*Attorney, Agent, or Firm*—Greenblum & Bernstein, P.L.C.

[57] ABSTRACT

A developing operation control device using an electro-developing recording medium on which an image is developed while an electric voltage is applied thereto. With starting the voltage application to the electro-developing medium, a voltage applied to a liquid crystal display included in the electro-developing recording medium is increased. When a predetermined time has passed since the voltage application to the electro-developing recording medium is started, an exposure onto the electro-developing recording medium is started. By starting the exposure, a bright portion occurs on the electro-developing recording medium, and the voltage applied to the bright portion of the liquid crystal display is quickly raised in comparison with a dark portion. The voltage application to the electro-developing recording medium is stopped at a predetermined timing.

18 Claims, 23 Drawing Sheets

DEVICE FOR CONTROLLING DEVELOPING OPERATION OF ELECTRO-DEVELOPING TYPE CAMERA

BACKGROUND OF THE INVENTION

1. Field of the Invention

The present invention relates to a camera using a so-called electro-developing recording medium, in which an image obtained by exposing the recording medium is electronically developed, and more particularly to a device for controlling the developing operation of the recording medium.

2. Description of the Related Art

Conventionally, there is known a photographic material which electronically develops an optical image formed thereon through a photographing lens. Japanese Unexamined Patent Publication No. 5-2280, for example, discloses a recording medium which is a combination of an electrostatic information recording medium and an electric charge keeping medium. In this specification, such a recording medium is referred to as an electro-developing recording medium, and a camera using the electro-developing recording medium is referred to as an electro-developing type camera.

In the electro-developing recording medium disclosed in the above publication, the electrostatic information recording medium has a photoconducting layer and an inorganic oxide material layer, and the electric charge keeping medium has a liquid crystal display. In this structure, when the electrostatic information recording medium is exposed while an electric voltage is applied to the electrostatic information recording medium and the electric charge keeping medium, electric charge in accordance with the amount of incident light is generated in the electrostatic information recording medium. Since the intensity of electric field applied to the liquid crystal display facing the electrostatic information recording medium is varied in accordance with the generated electric charge, an image corresponding to the amount of light distribution is indicated or developed on the liquid crystal display.

Japanese Unexamined Patent Publication Nos. 5-165005, 6-130347 and 7-13132 disclose an electro-developing recording medium which comprises a liquid crystal display having a memory-type liquid crystal so that an image indicated on the liquid crystal display is kept even if the electric field applied to the liquid crystal display is removed. '347 and '132 disclose an electro-developing recording medium in which the electrostatic information recording medium and the electric charge keeping medium are combined to form one body. Namely, in these electro-developing recording mediums, even if an electric voltage applied thereto is removed, the image formed on the electro-developing recording medium is kept.

When an object to be photographed is extremely bright, a proper exposure can be attained if an opening degree of an aperture is lowered or a shutter speed is made high. Conversely, when a proper exposure is not attained even by such a process, or when the opening degree is to be made large so that a depth of field is shortened, a recording medium having a low sensitivity must be employed in a conventional device.

Namely, a dynamic range of light which can be recorded on an electro-developing recording medium is determined in accordance with the characteristics of the electro-developing recording medium. Therefore, when the difference between lightness and darkness of the object to be photographed exceeds the dynamic range of the electro-developing recording medium, appropriate photography can not be performed.

Further, when red, green and blue images are recorded on an electro-developing recording medium using a dichroic optical member, if the light intensities of the color components are different from each other due to the characteristics of a light source illuminating the object, for example, a proper exposure may not be obtained for one color component image, even if a proper exposure can be obtained for another color component image.

SUMMARY OF THE INVENTION

Therefore, an object of the present invention is to provide a developing operation control device by which a developing operation is properly performed so as to obtain an image having a proper contrast or color, regardless of the characteristics of the electro-developing recording medium or of the illumination light radiated onto the object to be photographed.

According to the present invention, there is provided a developing operation control device comprising an electro-developing recording medium electronically developing an image which is formed thereon, exposing means, applying means and activating means.

The exposing means exposes the electro-developing recording medium to form the image. The applying means applies a voltage to the recording medium so that the image can be developed by the recording medium. The activating means activates the exposing means and the applying means in such a manner that an exposure of the exposing means and a voltage application of the applying means are performed at a different timing.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
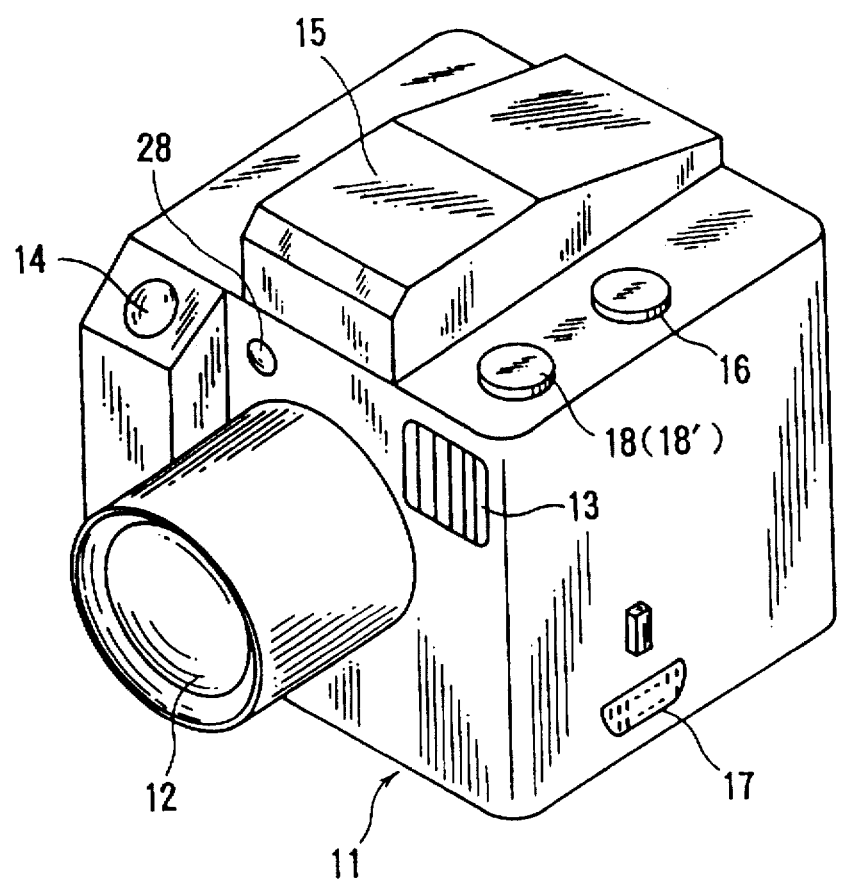
FIG. 1 is an external view showing a still video camera to which first through fourth embodiments according to the present invention are applied.

FIG. 1 is an external view of a still video camera to which a first embodiment of the present invention is applied. This still video camera is an electro-developing type camera, which is constructed in such a manner that an image is developed by an electro-developing recording medium.

When viewing the camera body 11 from a front side, on the front surface of the camera body 11, a photographing optical system 12 including a photographing lens and so on is provided on approximately the central portion of the front surface, and an electronic flash 13 is disposed on a portion to the right of and above the photographing optical system 12. A release switch 14 is provided on the side of the optical system 12 opposite to the electronic flash 13. A photometry sensor 28 is disposed close to the photographing optical system 12 and the release switch 14.

On the upper surface of the camera body 11, a view finder 15 is provided at the center portion thereof, and extends from the front side of the camera body 11 to the rear side thereof. Further, on the upper surface, a scan start switch 16 and a sensitivity select switch 18 are provided close to the view finder 15. On a side surface of the camera body 11, an output terminal 17 is formed on a lower portion thereof so that an image signal obtained by the camera can be outputted to an external recording device.

Figure 2:
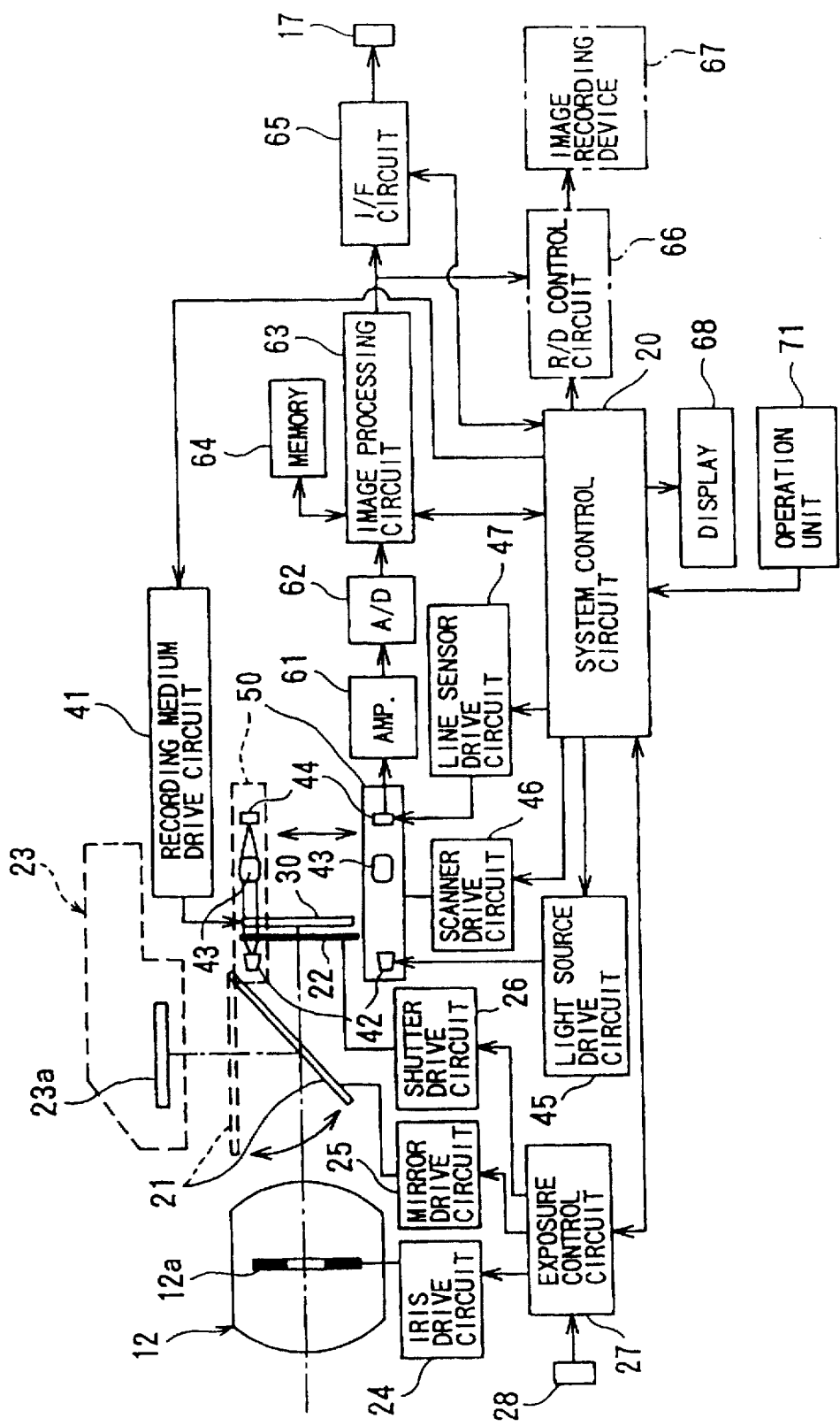
FIG. 2 is a block diagram of the still video camera of the first embodiment.

FIG. 2 is a block diagram of the still video camera. A system control circuit 20, comprising a micro-computer, is mounted to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view-finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24 under control of the exposure control circuit 27 based on an output signal of the photometry sensor 28.

The quick return mirror 21 is usually set to a down position (an inclining position shown by the solid lines in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken lines in the drawing), so that the light beam is led to the electro-developing recording medium 30.

The shutter 22 is usually closed, and upon a photographing operation, the shutter 22 is opened for a predetermined period by the shutter drive circuit 26 under the control of the exposure control circuit 27. Thus, the light beam passing through the photographing optical system 12 enters a light receiving surface of the electro-developing recording medium 30.

An electric voltage is applied to the electro-developing recording medium 30 under the control of a recording medium drive circuit 41. By exposing the electro-developing recording medium 30 while applying the voltage, an image formed by the photographing optical system 12 is electronically developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42, including an LED (light emitting diode), for example, a scanner optical system 43 and a line sensor 44 are supported by the scanning mechanism 50, and are moved along the electro-developing recording medium 30 by a scanning operation of the scanning mechanism 50.

The line sensor 44 may be a one dimensional CCD sensor of for example, 2000 pixels. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. When a scanning is carried out by the scanning mechanism 50, the light source 42 is positioned in front of the electro-developing recording medium 30 and opposite to the line sensor 44 relative to the electro-developing recording medium 30, so that the image developed by the electro-developing recording medium 30 is illuminated by the light source 42 and formed on the light receiving surface of the line sensor 44 due to an operation of the scanner optical system 43. Namely, the scanner optical system 43 is disposed on the optical path of the light beam which passes through the electro-developing recording medium 30, and the line sensor 44 is moved in an imaging plane, on which an image is formed, by the scanner optical system 43.

ON-OFF control of the light source 42 is performed by a light source drive circuit 45. Control of the reading operation of the pixel signal generated in the line sensor 44 is carried out by a line sensor drive circuit 47. Control of the movement of the scanning mechanism 50 is performed by a scanner drive circuit 46. The circuits 45, 46 and 47 are controlled by the system control circuit 20.

A pixel signal read out from the line sensor 44 is amplified by an amplifier 61, and converted to a digital signal by an A/D converter 62.

The digital pixel signal is subjected to a shading correction, a gamma correction and so on by an image processing circuit 63 under control of the system control circuit 20, and then, is temporarily stored in a memory 64. The memory includes an EEPROM in which correction data for the shading correction is stored. Note that the memory 64 may have a storage capacity equal to one horizontal scanning line outputted from the line sensor 44, or it may have a storage capacity of one frame's worth of image signals.

The pixel signal outputted from the memory 64 is inputted into an interface circuit 65 through the image processing circuit 63, so that the pixel signal is subjected to a predetermined process such as a format conversion, and can be outputted to an external display device (not shown) through the output terminal 17. The pixel signal outputted from the image processing circuit 63 is subjected to a predetermined process, such as an image compression and a format conversion, in a recording device control circuit 66, so that the pixel signal can be recorded on a recording medium, such as an IC memory card, for example, in an image recording device 67. The interface circuit 65 and the recording device control circuit 66 are operated in accordance with a command signal outputted from the system control circuit 20.

An operation unit 71 including the release switch 14, the scan start switch 16 and the sensitivity select switch 18 is connected to the system control circuit 20. The sensitivity of the electro-developing recording medium 30 is changed in accordance with the operation of the sensitivity select switch 18. A photographing operation is performed by the operation of the release switch 14. A reading operation, by which an image signal is read from the electro-developing recording medium 30, is performed in accordance with the operation of the scan start switch 16. Further, a display device 68 for indicating various setting conditions of the still video camera is connected to the system control circuit 20.

Figure 3:
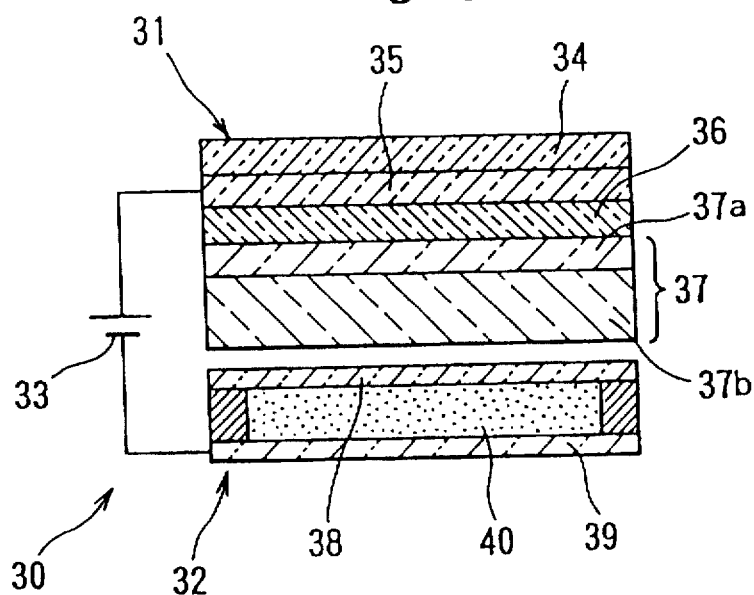
FIG. 3 is a sectional view showing a first example of a structure of an electro-developing recording medium.

FIG. 3 shows a first example of a structure of the electro-developing recording medium 30, and is the same as that shown in Japanese Unexamined Patent Publication No. 5-2280.

The electro-developing recording medium 30 has an electrostatic information recording medium 31 and an electric charge keeping medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge keeping medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

An ON-OFF condition of the electric power source 33 is controlled by the recording medium drive circuit 41 (see FIG. 2). When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge keeping medium 32 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) at a predetermined temperature. In such a case, the same electric charge keeping medium 32 can be used repeatedly.

Figure 4:
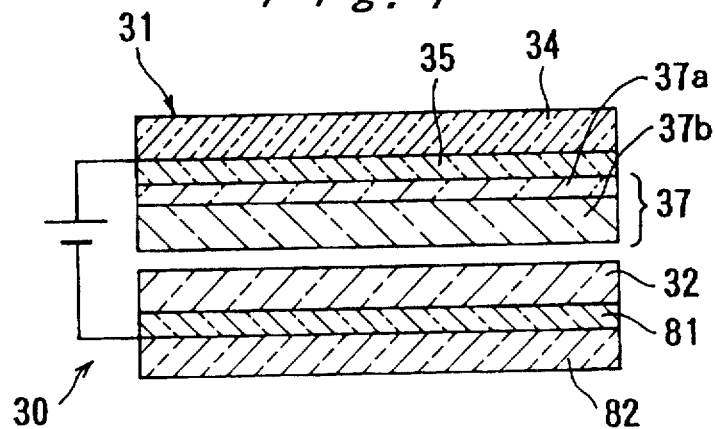
FIG. 4 is a sectional view showing a second example of a structure of an electro-developing recording medium.

FIG. 4 shows a second example of a structure of the electro-developing recording medium 30, and is the same as that shown in Japanese Unexamined Patent Publication No. 5-165005.

The electrostatic information recording medium 31 is formed by laminating the base plate 34, the electrode layer 35 and the photoconducting layer 37, and the photoconducting layer 37 is formed by laminating the electric charge generating layer 37a and the electric charge transferring layer 37b. The electric charge keeping medium 32 is a liquid crystal display having a memory-type liquid crystal such as a smectic liquid crystal, and faces the photoconducting layer 37 with a small gap therebetween. An electrode layer 81 and a base plate 82 are laminated on a surface of the electric charge keeping medium 32, which surface is opposite to the electrostatic information recording medium 31. The other structures are the same as those shown in FIG. 3.

Figure 5:
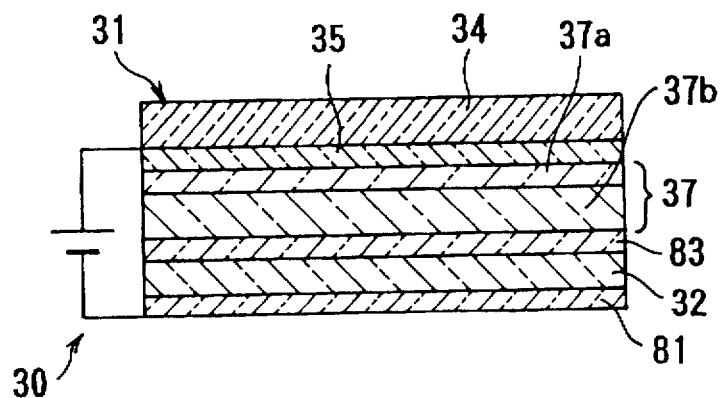
FIG. 5 is a sectional view showing a third example of a structure of an electro-developing recording medium.

FIG. 5 shows a third example of a structure of the electro-developing recording medium 30, and is the same as that shown in Japanese Unexamined Patent Publication Nos. 6-130347 and 7-13132.

This electro-developing recording medium 30 is of a unibody type. In the electro-developing recording medium 30, an insulating layer 83 is provided between the electric charge transferring layer 37b of the electrostatic information recording medium 31 and the electric charge keeping medium 32 which is a liquid crystal display having a memory-type liquid crystal such as a smectic liquid crystal, and an electrode layer 81 is laminated on a surface of the electric charge keeping medium 32 which surface is opposite to the electrostatic information recording medium 31. The other structures are the same as those shown in FIG. 5. Namely, no gap is formed between the electrostatic information recording medium 31 and the electric charge keeping medium 32.

The electro-developing recording medium 30 shown in FIGS. 3 through 5 can be used in the still video camera having an electric circuit shown in FIG. 1, and in the following description, it is supposed that the still video camera is provided with the electro-developing recording medium 30 shown in FIG. 3.

Figure 6:
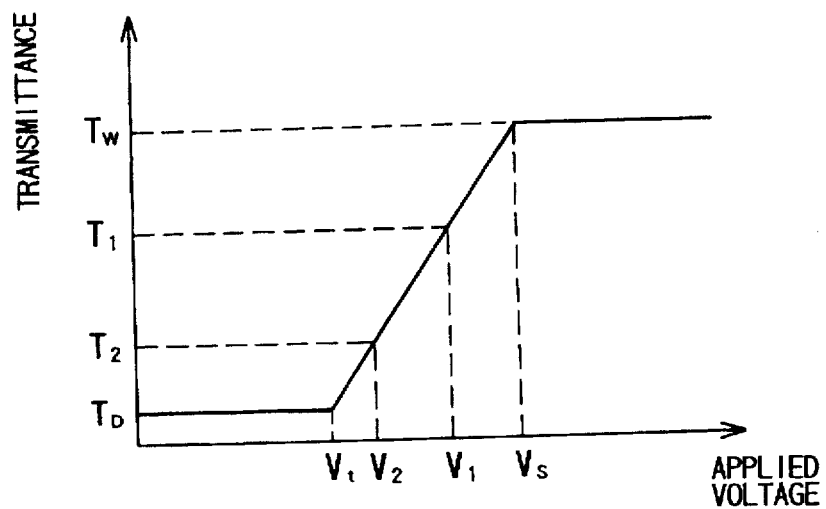
FIG. 6 is a diagram showing a relationship between an electric voltage applied to a liquid crystal and a transmittance of the liquid crystal.

FIG. 6 shows a relationship between an electric voltage applied to a liquid crystal and a transmittance of the liquid crystal. When the voltage is lower than a threshold value $V_r$, the transmittance shows the minimum value $T_D$, and the liquid crystal is opalescent. When the voltage is raised, the transmittance is raised with the voltage. When the voltage becomes higher than or equal to the upper limit value $V_S$, the transmittance becomes the maximum value $T_W$, so that the liquid crystal becomes transparent. The relationship between the voltage and the transmittance as described above, namely the ratio of the change of the transmittance to the change of the voltage, is inherent to the liquid crystal.

Figure 7:
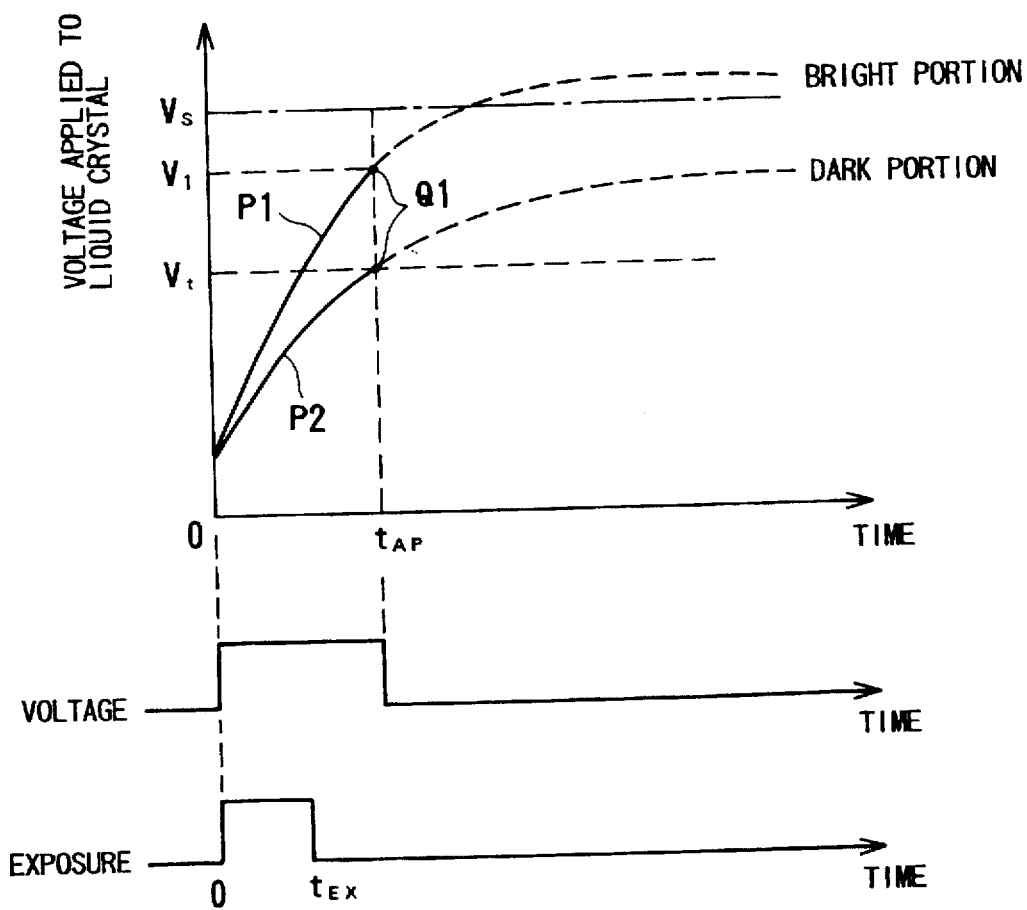
FIG. 7 is a diagram showing a time variation of a voltage applied to a liquid crystal when an exposure and a voltage application to the electro-developing recording medium are started at the same time.

FIG. 7 shows a time variation of a voltage applied to a liquid crystal when an exposure and a voltage application to the electro-developing recording medium are started at the same time, which is a conventional control. With reference to this drawing, a contrast of an image developed by the liquid crystal is described below. Note that, in the example shown in FIG. 7, the exposure is carried out until time $t_{EX}$, and the voltage application to the electro-developing recording medium continues after the exposure is ended, to time $t_{AP}$.

Electric charges corresponding to the image are generated on the electrostatic information recording medium 31 (see FIG. 3), and thus, the conductivity of the electrostatic information recording medium 31 is changed. The larger the conductivity, the brighter the portion of the image. In other words, the resistive value of each portion of the electrostatic information recording medium 31 becomes smaller in those portions corresponding to bright portions of the image. Therefore, in the liquid crystal, the voltage in the bright portions of the image is relatively quickly raised (reference P1), and the voltage in the dark portions of the image is relatively slowly raised (reference P2). Namely, the voltage difference between the bright portions and the dark portions become large with the elapse of time, and if the voltage application to the electro-developing recording medium is stopped at time $t_{AP}$ at which the voltage of the dark portions reaches the threshold value $V_r$ (see FIG. 6), an image having a contrast corresponding to the difference (reference Q1) between the voltage $V_1$ in the bright portions and the voltage $V_2$ in the dark portions is kept in the liquid crystal.

Figure 8:
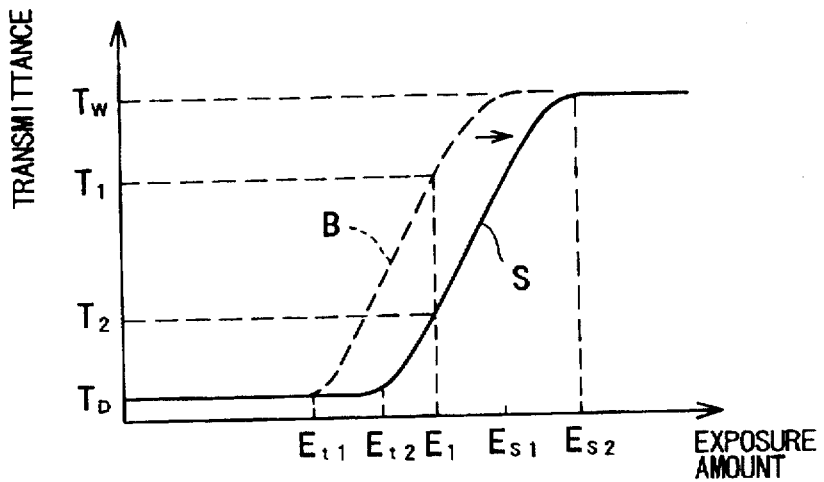
FIG. 8 is a diagram showing a relationship between an exposure amount to an electro-developing recording medium and a transmittance of a liquid crystal.

FIG. 8 shows a relationship between an exposure amount of an electro-developing recording medium and a transmittance of a liquid crystal. The broken line B shows a relationship between the exposure amount and the transmittance when the exposure and the voltage application are started at the same time, as shown in FIG. 7, and the solid line S shows a relationship between the exposure amount and the transmittance when the exposure is started after the voltage application. The exposure amount is equal to the product of the exposure luminance of the electro-developing recording medium and the exposure period $t_{EX}$ (see FIG. 7), and it is supposed that the exposure period $t_{EX}$ is constant for the explanation in this example.

In case of the curve line shown by the broken line B, when the exposure amount is less than a first threshold value $E_{r1}$, the transmittance of the liquid crystal shows the minimum value $T_D$. As the exposure amount is increased, the transmittance of the liquid crystal is increased and reaches the maximum value $T_W$ when the exposure amount becomes higher than or equal to a first upper limit $E_{S1}$. Namely, the liquid crystal becomes transparent, and does not change even if the exposure amount is increased further. In other words, development by the electro-developing recording medium is impossible for an image brighter than that corresponding to the upper limit $E_{S1}$.

In this embodiment, a sensitivity of the electro-developing recording medium is controlled to be lowered so that an extremely bright image can be developed, and thus, the characteristic curve showing the relationship between the exposure amount and the transmittance is shifted rightward in comparison with the broken line B, as shown by the solid line S. Namely, the transmittance is started to be increased at a second threshold value $E_{r2}$ which is higher than the first threshold value $E_{r1}$, and reaches the maximum value $T_W$, at a second upper limit $E_{S2}$ which is higher than the upper limit $E_{S1}$.

At the exposure amount $E_1$, while the transmittance is $T_1$ in the characteristic line B, the transmittance shows $T_2$, which is lower than $T_1$, in the characteristic line S. Namely, the sensitivity of the electro-developing recording medium is lowered, so that the luminance of the developed image is lowered as a whole, and thus, an extremely bright image can be developed.

Figure 9:
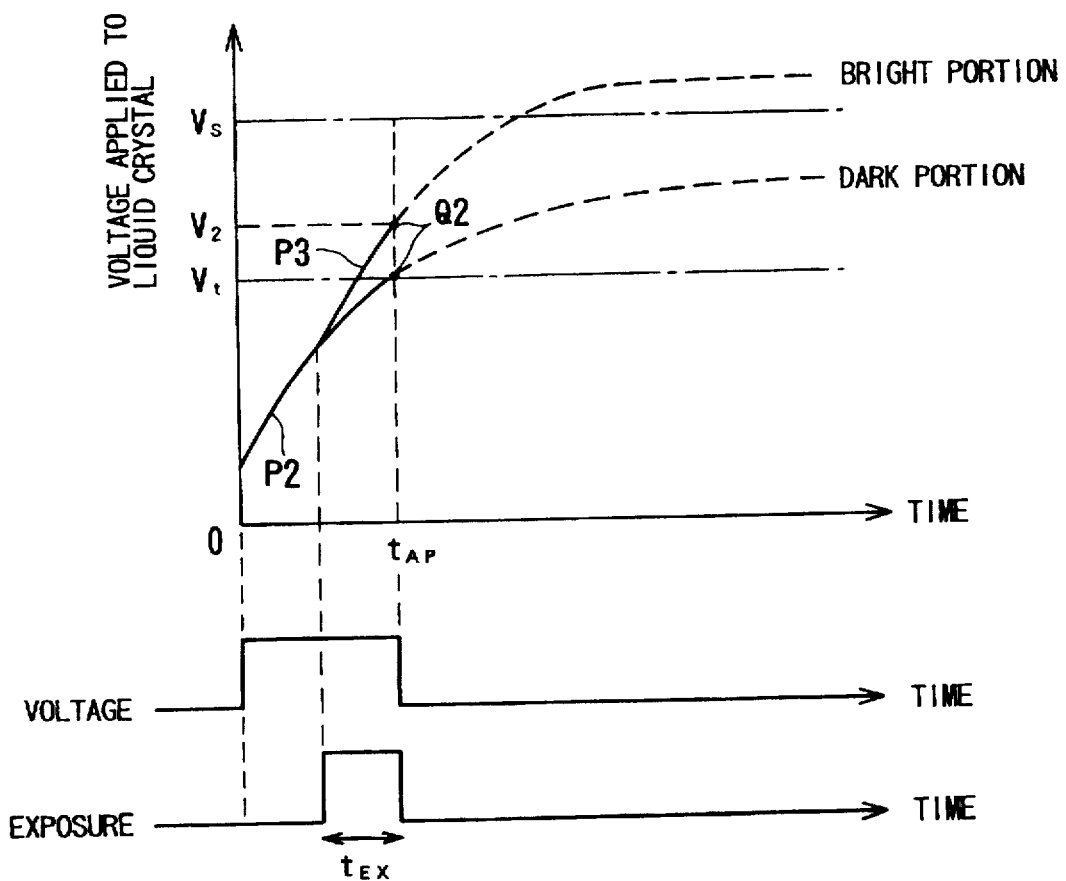
FIG. 9 is a diagram showing a time variation of the voltage of a liquid crystal in an exposure control for lowering a sensitivity of the liquid crystal.

FIG. 9 shows a time variation of the voltage of a liquid crystal in an exposure control for lowering a sensitivity of the liquid crystal, and is a graph similar to FIG. 7. The time length $t_{AP}$ voltage application and the time length $t_{EX}$ of exposure are the same as those of FIG. 7, and the timing of the exposure and the voltage application are different from those of FIG. 7. Namely, the exposure is started later than the voltage application, and is ended approximately at the same time as the end of the voltage application.

In FIG. 7, when starting the voltage application to the electro-developing recording medium, since the electro-developing recording medium has not been exposed, an image formed on the electro-developing recording medium is entirely dark, and therefore, the voltage applied to the liquid crystal is relatively gently increased (reference P2). When the exposure is started, a bright portion is generated on the electro-developing recording medium. Since the voltage rise (reference P3) in the bright portion is relatively quick (similar to that shown in FIG. 7), the voltage difference between the bright portion and the dark portion becomes large with an elapse of time. If the voltage application to the electro-developing recording medium is stopped at time $t_{AP}$ at which the voltage of the dark portion reaches the threshold value $V_r$, an image having a contrast corresponding to the difference (reference Q2) between the voltage $V_2$ of the bright portion and the voltage $V_t$ of the dark portion is kept in the liquid crystal. In comparison with FIG. 7, since the timing at which the exposure is started is delayed, the voltage difference Q2 is smaller than the voltage difference Q1. Therefore, as shown by the characteristic S of FIG. 8, the sensitivity of the electro-developing recording medium is substantially lowered, and thus, a contrast is generated even for an extremely bright image, so that the image can be developed.

Figure 10A:
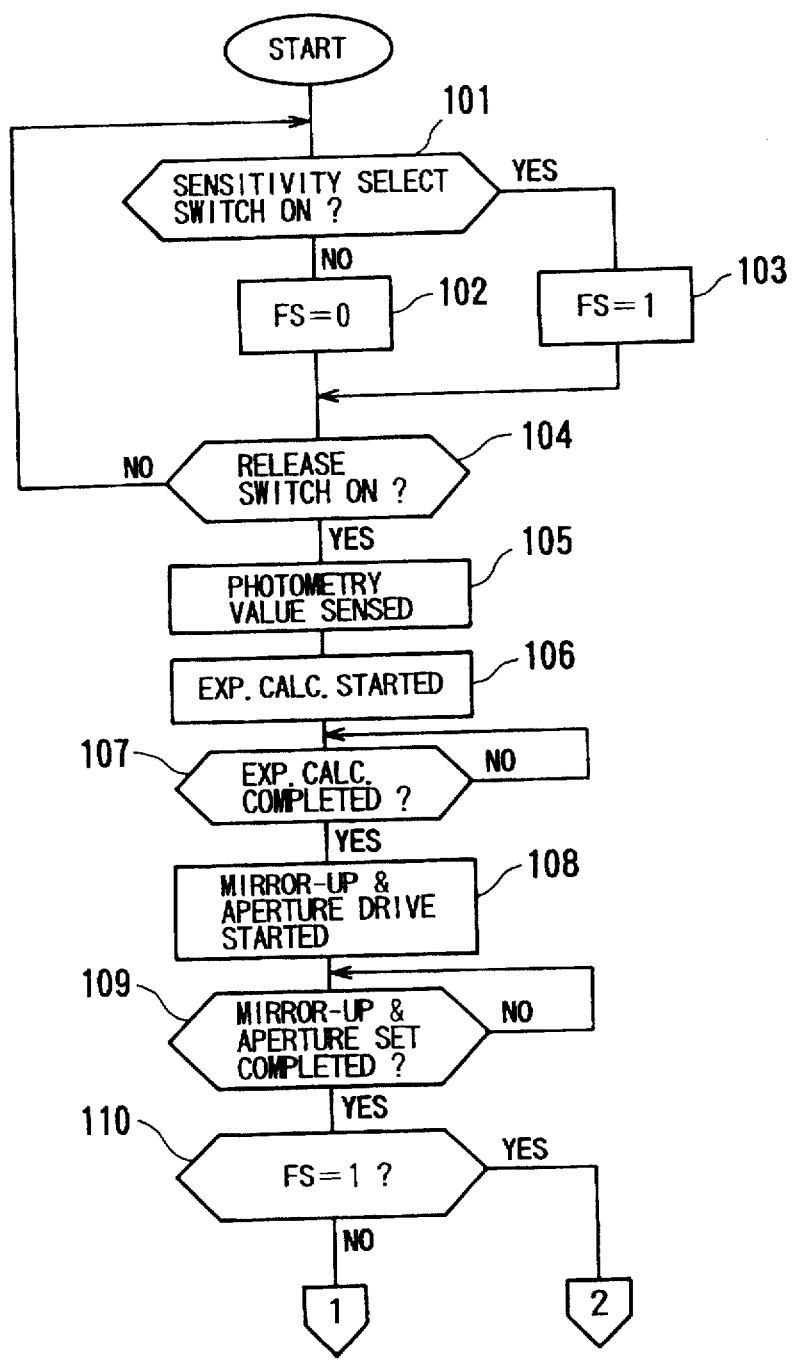
FIGS. 10A and 10B are flow charts of a photographing operation in the first embodiment.
Figure 10B:
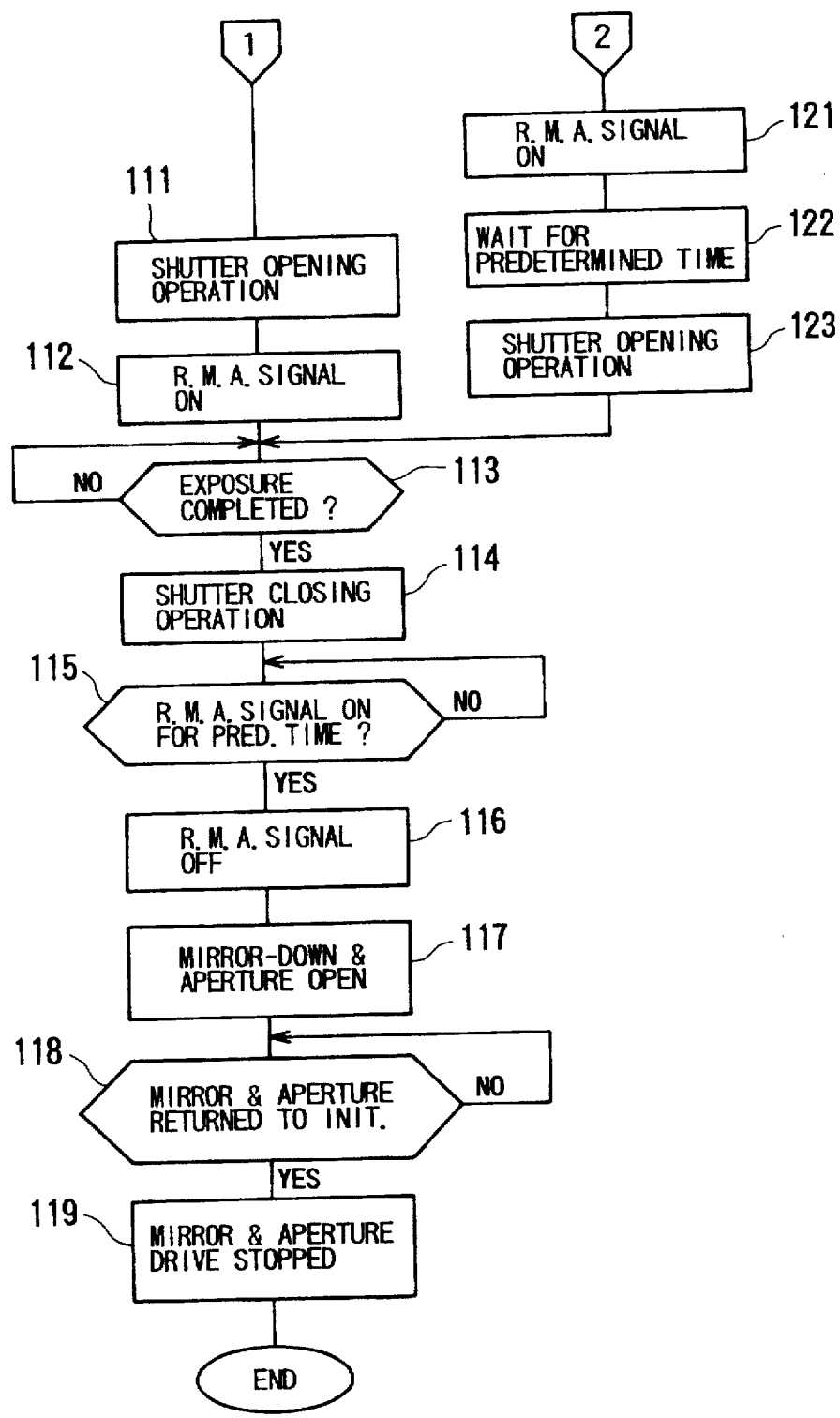

FIGS. 10A and 10B show a flow chart of a photographing operation. With reference to the drawing, an operation of the first embodiment will be described.

In Step 101, it is determined whether the sensitivity select switch 18 has been turned ON. When the sensitivity select switch has been turned OFF, in Step 102, a flag FS is reset to 0 so that a normal sensitivity mode is set. Conversely, when the sensitivity select switch has been turned ON, in Step 103, the flag FS is set to 1 so that a low sensitivity mode is set.

It is determined in Step 104 whether the release switch 14 has been turned ON. When the release switch 14 has not been turned ON, the process returns to Step 101, and when the release switch 14 is switched to an ON-state, the process goes to Step 105, in which an output signal of the photometry sensor 28, i.e., a photometry value, is sensed. In Step 106, an exposure calculation is started based on the photometry value. When it is confirmed in Step 107 that the exposure calculation has been completed, in Step 108, the opening degree of the aperture 12a is changed from the fully open state to a predetermined opening degree, and the quick return mirror 21 is changed from the down condition to the up-condition. When it is confirmed in Step 109 that the quick return mirror 21 has been changed to the up-condition and the opening degree adjustment of the aperture 12a has been completed, Step 110 is executed so that it is determined whether flag FS has been set to 1.

When the flag FS is set to 0, namely, when the normal sensitivity is set, the shutter 22 is opened in Step 111, so that an exposure onto the electro-developing recording medium 30 is started. Then, in Step 112, a recording medium activating signal is set to an ON-state so that a voltage application to the electro-developing recording medium 30 is started. Namely, the voltage application and the exposure are started at the same time as shown in FIG. 7. When, in Step 113, the exposure time $t_{EX}$ obtained in the exposure calculation has passed and it is sensed that the exposure has been completed, the shutter 22 is closed in Step 114. In Step 115, it is determined whether or not a predetermined time has passed since the recording medium activating signal has been turned ON. When it is sensed that the predetermined time has passed, namely when it is sensed that the voltage application has been performed for the predetermined time $t_{AP}$, the recording medium activating signal is changed to an OFF-state in Step 116. In Step 117, the quick return mirror 21 is changed to the down-condition and the aperture 12a is driven to the fully open condition. When it is confirmed in Step 118 that the mirror 21 and the aperture 12a have returned to the initial conditions, respectively, the operations of the mirror 21 and the aperture 12a are stopped in Step 119, and thus, this photographing operation program ends.

Conversely, when it is determined in Step 110 that the flag FS is 1, namely when the low sensitivity mode has been set, the recording medium activating signal is set to an ON-state, so that a voltage application to the electro-developing recording medium 30 is started. Namely, as shown in FIG. 9, first, the voltage application is started. In Step 122, a waiting time for a predetermined time is provided, and the shutter 22 is started to open in Step 123. Namely, the exposure is started after the voltage application. Then, Step 113 and the following Steps are executed so that the process described above is executed.

As described above, in the first embodiment, the exposure is started after the voltage application to the electro-developing recording medium 30 is started. Therefore, in comparison with a case in which the voltage application and the exposure are simultaneously started, since a timing at which the voltage raise in a bright portion in the liquid crystal is started is delayed, the voltage difference between the bright portion and the dark portion in the liquid crystal 40 is smaller, and thus, the sensitivity of the electro-developing recording medium 30 is substantially lowered. Namely, according to the first embodiment, a proper contrast is generated even for an extremely bright image, so that the image can be suitably developed. Therefore, without using electro-developing recording mediums having different sensitivities, objects having a wide range of luminance can be photographed by using a single electro-developing recording medium 30.

Figure 11:
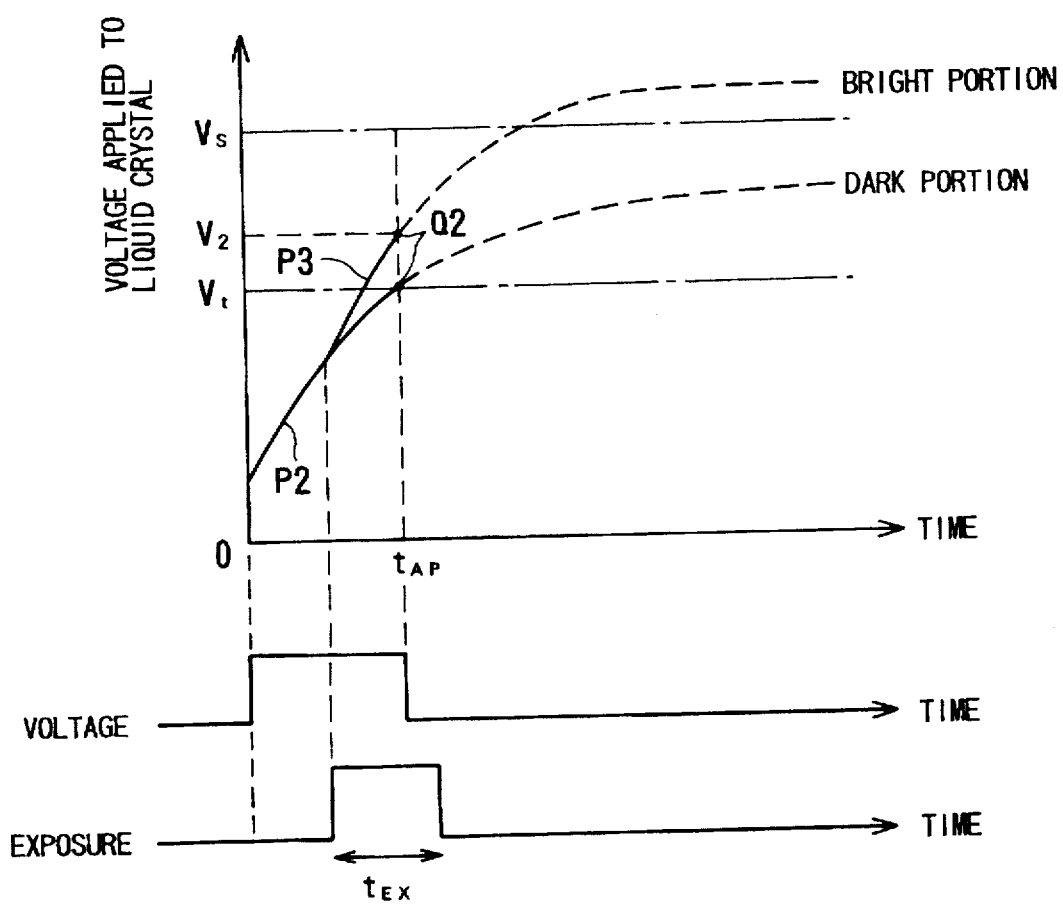
FIG. 11 is a diagram showing another example of a time variation of the voltage of the liquid crystal in the exposure control in the first embodiment.

Note that, although the voltage application is ended approximately at the same time when the exposure is ended in the example shown in FIG. 9, the voltage application may be ended before the exposure is ended, as shown in FIG. 11.

With reference to FIGS. 12 through 19, a second embodiment of the present invention will be described. In the second embodiment, the still video camera has the same external view as the first embodiment shown in FIG. 1, and has basically the same electric circuits as the first embodiment shown in FIG. 2. In the second embodiment, the sensitivity select switch 18 is replaced with a range select switch 18' (see FIG. 1). Namely, in the second embodiment, a dynamic range of the electro-developing recording medium 30 is changed by operation of the range select switch 18'.

Figure 12:
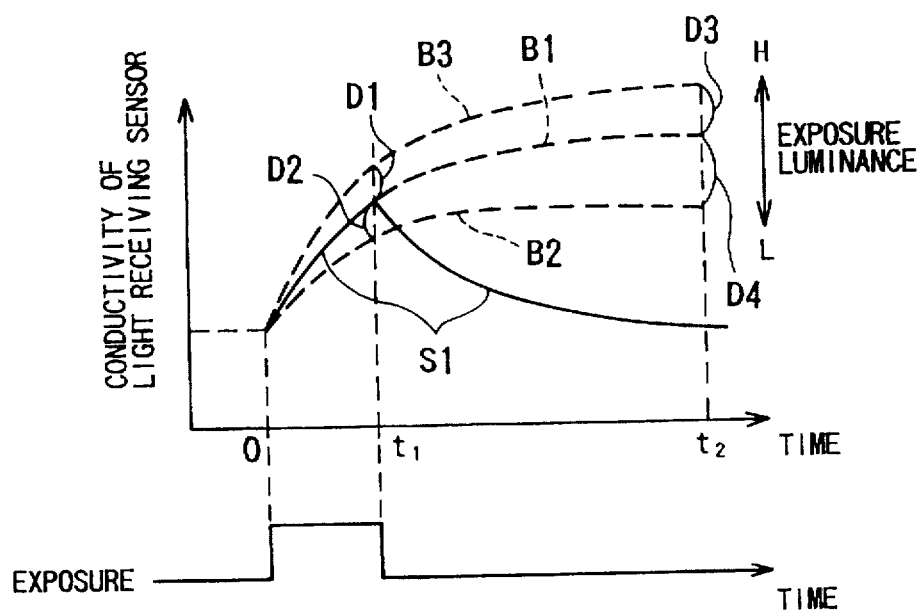
FIG. 12 is a diagram showing a time variation of conductivity of a light receiving sensor when the light receiving sensor is exposed to light.

FIG. 12 shows a time variation of conductivity of the electrostatic information recording medium 31 (i.e., a light receiving sensor) when the light receiving sensor is exposed to light. As shown by a solid line S1, due to the start of the exposure, an electric charge is generated in the light receiving sensor, so that the conductivity increases, and by stopping the exposure at time t1, the conductivity gradually decreases. The conductivity lowers with time, and converges approximately to the initial value at time t2. If the exposure is not ended at time t1, the conductivity would further increase as shown by a broken line B1, and the rate of increase of the conductivity would decrease with time.

Figure 13:
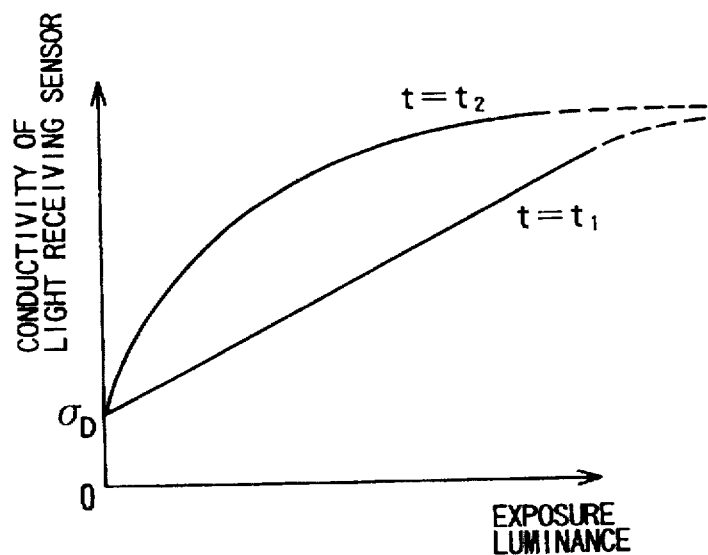
FIG. 13 is a diagram showing a relationship between an exposure luminance and a conductivity, in which time is a parameter.

The conductivity varies in accordance with the luminance of the object (i.e., an exposure luminance of light incident upon the light receiving sensor). Namely, when the exposure luminance is lower, as shown by a broken line B2, the conductivity becomes smaller than that shown by the broken line B1, and when the exposure luminance is higher, as shown by a broken line B3, the conductivity becomes larger than that shown by the broken line B1. As shown in FIG. 13, although a ratio of increase of the conductivity to an increase of the exposure luminance is approximately linear at time t1, the non-linearity of the ratio becomes larger with time.

Namely, at time t2, for example, the larger the exposure luminance, the smaller the ratio of increase of the conductivity. In other words, at time t1 in FIG. 12, the difference D1 between the conductivity shown by the broken line B3 and that shown by the solid line S1 is approximately equal to the difference D2 between the conductivity shown by the solid line S1 and that shown by the broken line B2, whereas at time t2, the difference D3 between the conductivity shown by the broken line B3 and that shown by the broken line B1 is smaller than the difference D4 between the conductivity shown by the broken line B1 and that shown by the broken line B2.

Figure 14:
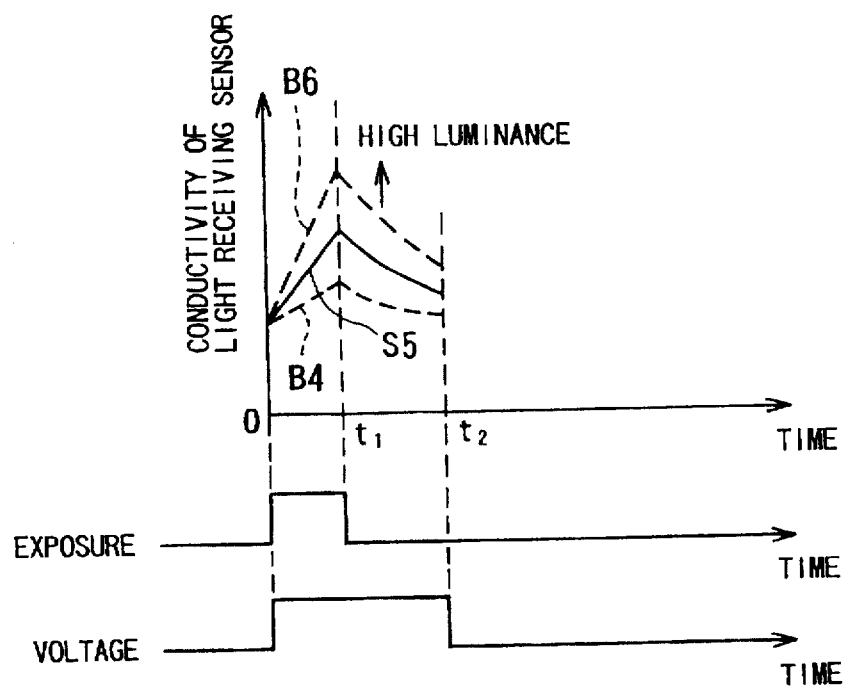
FIG. 14 is a diagram showing a time variation of the conductivity when the exposure and the voltage application are performed at the same time in the electro-developing recording medium.
Figure 15:
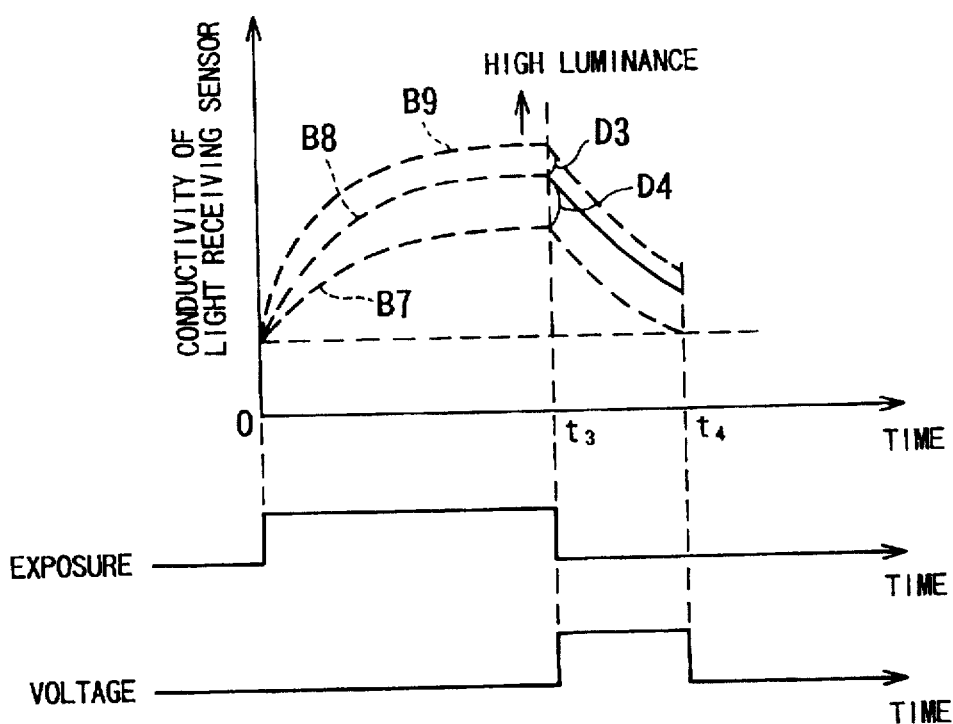
FIG. 15 is a diagram showing a first example of the second embodiment in which the voltage application to the electro-developing recording medium is started after the exposure thereof.

With reference to FIGS. 14 and 15, a developing operation of the liquid crystal while applying an electric voltage to the electro-developing recording material 30 is described below.

FIG. 14 shows the time variation of the conductivity existing in the light receiving sensor when the exposure and the application of voltage are started at the same time in the electro-developing recording medium 30. A broken line B4, a broken line B6 and a solid line S5 show a case in which the exposure luminance is small, a case in which the exposure luminance is large and a case in which the exposure luminance has a value between those shown by the broken lines B4 and B6, respectively. Since the exposure is ended when time t1 has passed after the exposure and the voltage application are started, the conductivity decreases after time t1, and the conductivity of the solid line S5 is always between those of the broken lines B4 and B6. Due to the voltage application, an image corresponding to the conductivity occurs or is developed in the liquid crystal, and the developed image of the liquid crystal is kept due to the stopping of the voltage application at time t2.

FIG. 15 shows an operation in which the voltage application is started in the electro-developing recording medium 30 after the exposure thereof is completed. A broken line B7, a broken line B9 and a broken line B8 show a case in which the exposure luminance is small, a case in which the exposure luminance is large and a case in which the exposure luminance has a value between those shown by the broken lines B7 and B8, respectively. In this operation, when time t3 has passed since the starting of the exposure, the exposure is stopped and the application of voltage to the electro-developing recording medium 30 is started.

As described above with reference to FIGS. 12 and 13, although, right after starting the exposure, the relationship between the exposure luminance and the conductivity is linear and the space between the broken lines B7 and B8 and the space between the broken lines B8 and B9 are approximately the same, the non-linearity of the relationship becomes large with time. Namely, in the light receiving sensor, at time t3, the difference D3 between the conductivity (the broken line B9) in a portion where the exposure luminance is large and the conductivity (the broken line B8) in a portion where the exposure luminance has an intermediate value is smaller than the difference D4 between the conductivity (the broken line B7) in a portion where the exposure luminance is small and the conductivity (the broken line B8) in a portion where the exposure luminance has the intermediate value.

The conductivity of the light receiving sensor begins to decrease due to the stopping of the exposure at time t3, and an image corresponding to the conductivity is generated or developed in the liquid crystal due to the starting of a voltage application at time t3. Then, due to the stopping of the voltage application at time t4, the image developed in the liquid crystal is kept thereafter. The non-linearity of the relationship between the exposure luminance and the conductivity is maintained while the voltage is applied to the electro-developing recording medium 30. Therefore, in the light receiving sensor, since the ratio of increase of the conductivity is small as the exposure luminance is high, the ratio of increase of the voltage applied to the liquid crystal to the increase of the exposure luminance is small. Thus, in the liquid crystal display, a transmittance corresponding to the exposure luminance is obtained even in a portion where the exposure luminance is high, and thus a proper contrast of the image is obtained.

Figure 16:
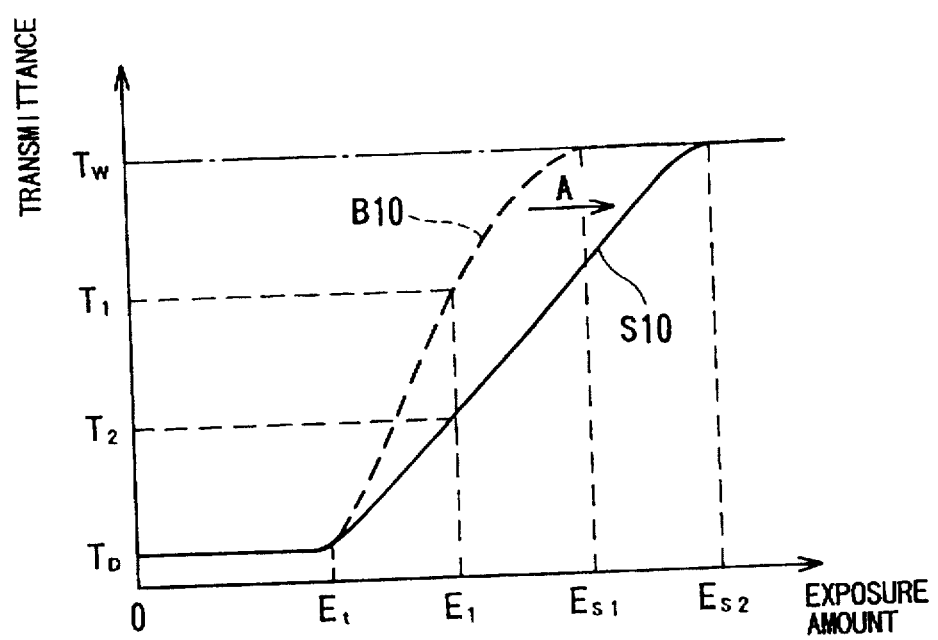
FIG. 16 is a diagram showing a relationship between the exposure amount of the electro-developing recording medium and the transmittance thereof.

FIG. 16 shows a relationship (a broken line B10) between the amount of exposure and the transmittance of the liquid crystal when the exposure and the application of voltage to the electro-developing recording medium 30 are started at the same time (see FIG. 14), and a relationship (a solid line S10) between the amount of exposure and the transmittance of the liquid crystal when the application of voltage to the electro-developing recording medium 30 is started after the exposure thereof (see FIG. 15). With reference to the drawing, the dynamic range of the electro-developing recording medium 30 will be described.

When the exposure and the voltage application are started at the same time (the broken line B10), the transmittance of the liquid crystal is at the minimum value $T_D$ while the exposure amount is less than the threshold value $E_t$, and it increases with increase of the exposure amount, and reaches the maximum value $T_W$ when the exposure amount rises above a first limit value $E_{S1}$. Namely, the liquid crystal becomes transparent, and the transmittance thereof is not changed even if the exposure amount is increased. In other words, for an image which is brighter than an image the transmittance of which is shown by the broken line B10, development is impossible, and therefore, the dynamic range of the electro-developing recording medium 30 is relatively small.

Conversely, when the voltage application is started after the exposure (the solid line S10), as described above with reference to FIG. 15, since a ratio of the increase of the conductivity of the light receiving sensor to the increase of the exposure luminance thereof is low in a portion where the exposure luminance is high (i.e., where the exposure amount is large), in the liquid crystal, a ratio of the increase of the transmittance to the increase of the exposure amount is smaller than that shown by the broken line B10. Namely, the inclination of the characteristic line shown by the solid line S10 is shallower than that of broken line B10. In other words, the slope of the line S10 is less than the slope of line B10. For example, at the exposure amount $E_1$, while the transmittance is $T_1$ in the broken characteristics line B10, the transmittance is $T_2$ in the solid characteristics line S10, and transmittance $T_2$ is smaller than $T_1$. On the other hand, at a second limit value $E_{S2}$ which is larger than the first limit value $E_{S1}$, the transmittance reaches the maximum value $T_W$.

Accordingly, by starting the voltage application after the exposure, the dynamic range of the electro-developing recording medium 30 can be expanded as shown by arrow A.

Figure 17A:
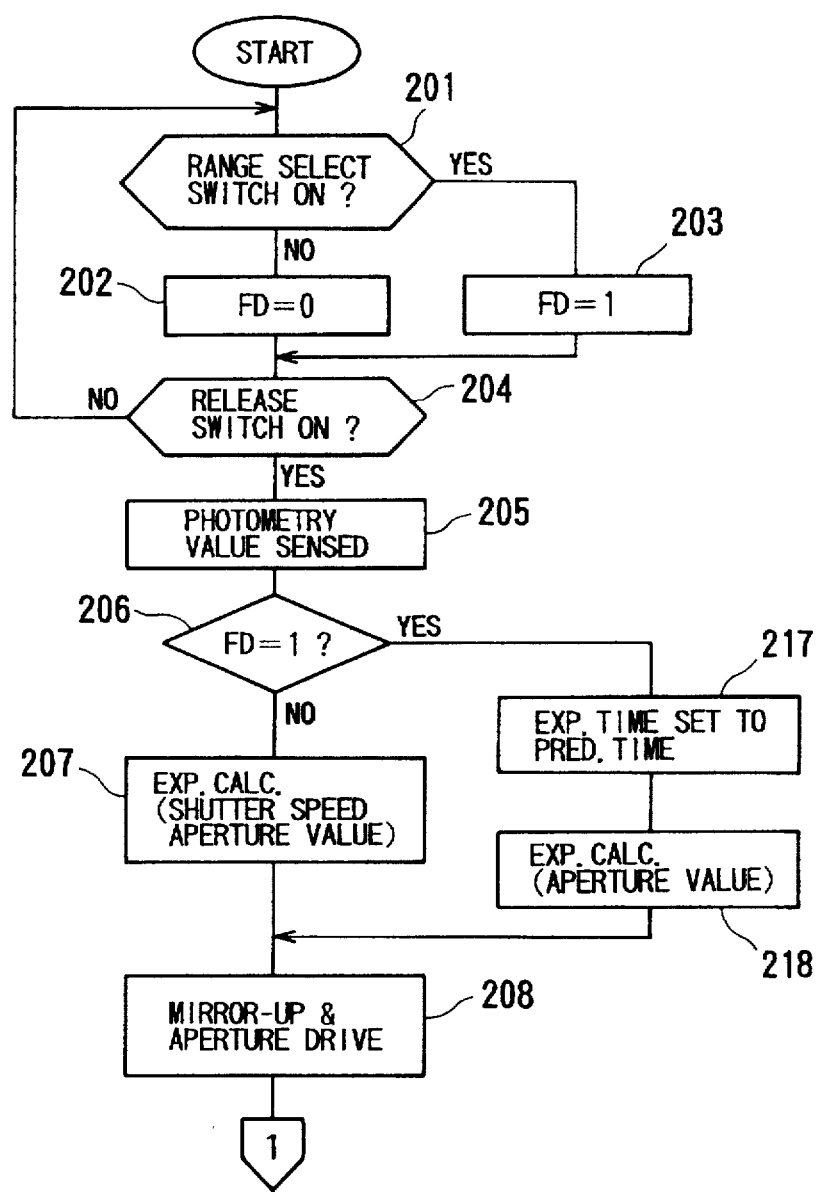
FIGS. 17A and 17B are flow charts of a photographing operation in the second embodiment.
Figure 17B:
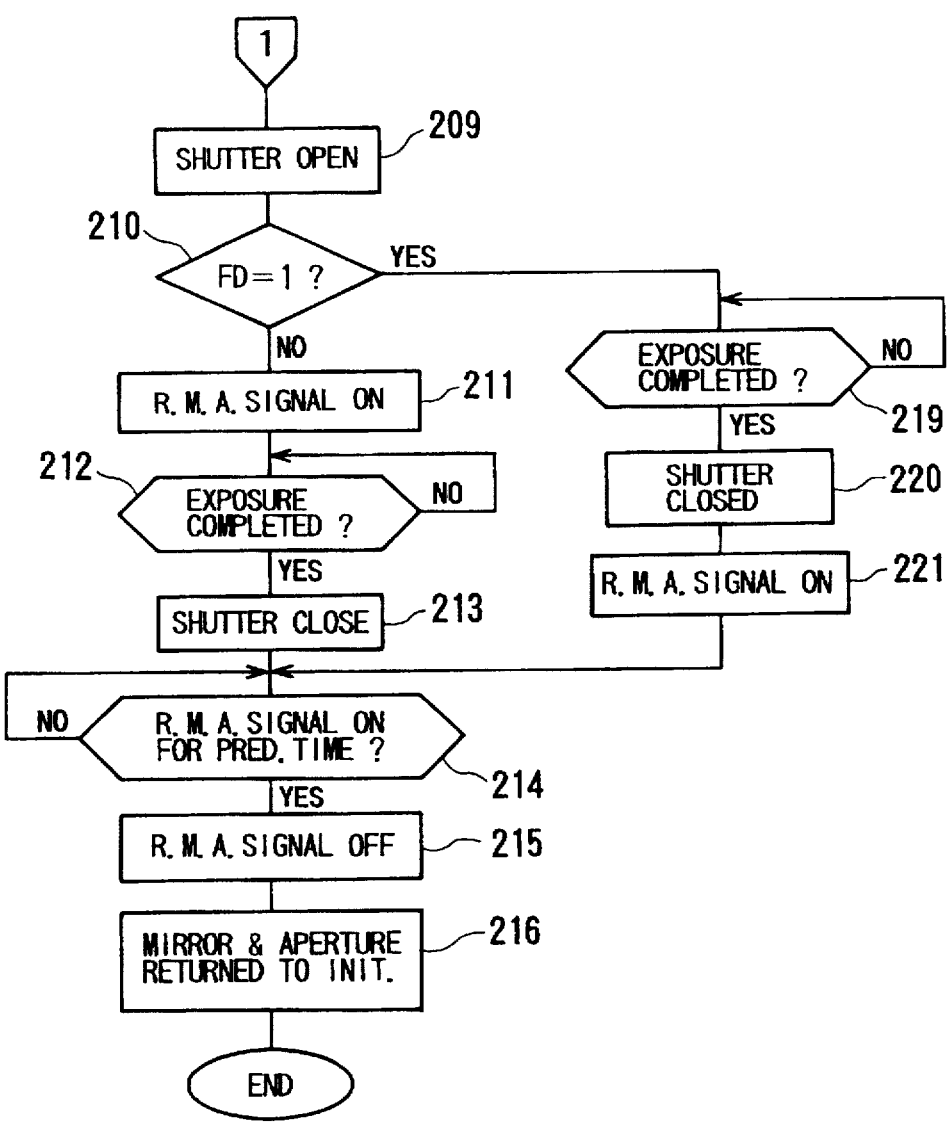

FIGS. 17A and 17B show flow charts of a photographing operation of the second embodiment.

In Step 201, it is determined whether the range select switch 18' has been turned ON. The range select switch is provided for switching the dynamic range of the electro-developing recording medium 30 between a normal range and an expanded range. When the range select switch 18' is turned OFF, a flag FD is reset to 0 in Step 202 so that the normal range mode is set, and when the range select switch 18' is turned ON, the flag FD is set to 1 in Step 203 so that the expanded range mode is set.

In Step 204, it is determined whether the release switch 14 has been turned ON. When the release switch 14 has not been turned ON, the process returns to Step 201, and when the release switch 14 has been turned ON, Step 205 is executed so that an output signal of the photometry sensor 28, i.e., a photometry value, is sensed. In Step 206, it is determined whether flag FD has been set to 1. Here, it is supposed that the flag FD has been set to 0. In this case, Step 207 is executed so that a photographing operation is performed with the normal range mode. Namely, an exposure calculation is performed based on the photometry value obtained in Step 205, so that the shutter speed and the aperture value are obtained.

Then, in Step 208, the opening degree of the aperture 12a is changed from the fully open state to a predetermined opening degree, and the quick return mirror 21 is changed from the down condition to the up-condition. In Step 209, the shutter 22 is opened, so that an exposure to the electro-developing recording medium 30 is started. Since it is supposed that the flag FD is 0, the process goes from Step 210 to Step 211, in which the recording medium activating signal is made ON so that the voltage application to the electro-developing recording medium 30 is started. Namely, the voltage application and the exposure are started at the same time as shown in FIG. 14. When the exposure time t1 obtained by the exposure calculation has passed, and thus it is sensed in Step 212 that the exposure has been completed, the shutter 22 is closed in Step 213.

In Step 214, it is determined whether a predetermined time has passed since the recording medium activating signal was made ON. When it is sensed that the predetermined time has passed, namely when it is sensed that the voltage application has been performed for the predetermined time t2, the recording medium activating signal is made OFF in Step 215. In Step 216, the quick return mirror 21 is changed from the up-condition to the down condition, and the aperture 12a is fully opened. In other words, the quick return mirror 21 and the aperture 12a are returned to the initial positions. Thus, this photographing operation routine is ended.

Conversely, when it is determined in Step 206 that the flag FD has been set to 1, a photography is performed with the expanded range mode as shown in FIG. 15. First, in Step 217, the exposure time t3 is set to a predetermined constant value. Namely, the expanded range mode is performed with a shutter speed priority mode. In Step 218, the exposure calculation is performed based on the exposure time t3 and the photometry value obtained in Step 205, so that the aperture value is calculated.

Then, in Step 208, the aperture 12a is set to a predetermined degree of opening, and the quick return mirror 21 is changed from the down condition to the up-condition. The shutter 22 is opened in Step 209, so that the exposure to the electro-developing recording medium 30 is started. Since, in Step 210, it is determined that the flag FD has been set to 1, the process goes to Step 219. When it is determined in Step 219 that the exposure time t3 has passed so that the exposure has been completed, the shutter 22 is closed in Step 220, and thus, the exposure is completed. Then, in Step 221, the recording medium activating signal is made ON, so that the voltage application to the electro-developing recording medium 30 is started. Namely, the voltage application is started after the exposure is ended, as shown in FIG. 15, when flag FD has been set to 1.

When it is sensed in Step 214 that a predetermined time (=t4−t3) has passed since the recording medium activating signal is made ON, the recording medium activating signal is made OFF in Step 215, and the quick return mirror 21 is changed to the down condition and the aperture 12a is fully opened in Step 216, so that the photographing operation routine is ended.

As described above, by applying an electric voltage to the electro-developing recording medium 30 after the exposure to the electro-developing recording medium 30 is ended, photography can be performed with an expanded dynamic range of the dynamic range of the electro-developing recording medium 30 in comparison with the normal dynamic range. Therefore, even if the difference between bright and dark light portions of the object to be photographed is above the usual dynamic range, a clear image having a proper contrast can be recorded.

Figure 18:
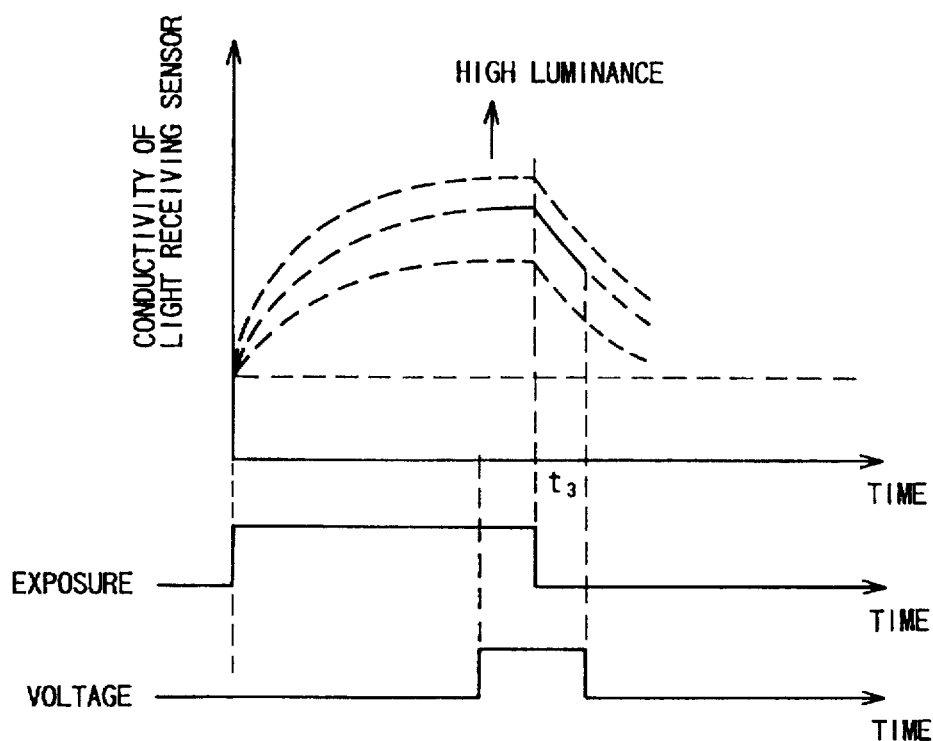
FIG. 18 is a diagram showing a second example of the second embodiment in which the voltage application to the electro-developing recording medium is started after the exposure thereof.

FIG. 18 shows a second example of an operation in which the dynamic range of the electro-developing recording medium 30 is expanded. In this example, the voltage application to the electro-developing recording medium 30 is started slightly before the exposure thereof is completed, and the length of time for the voltage application is the same as that of the first example shown in FIG. 15.

Figure 19:
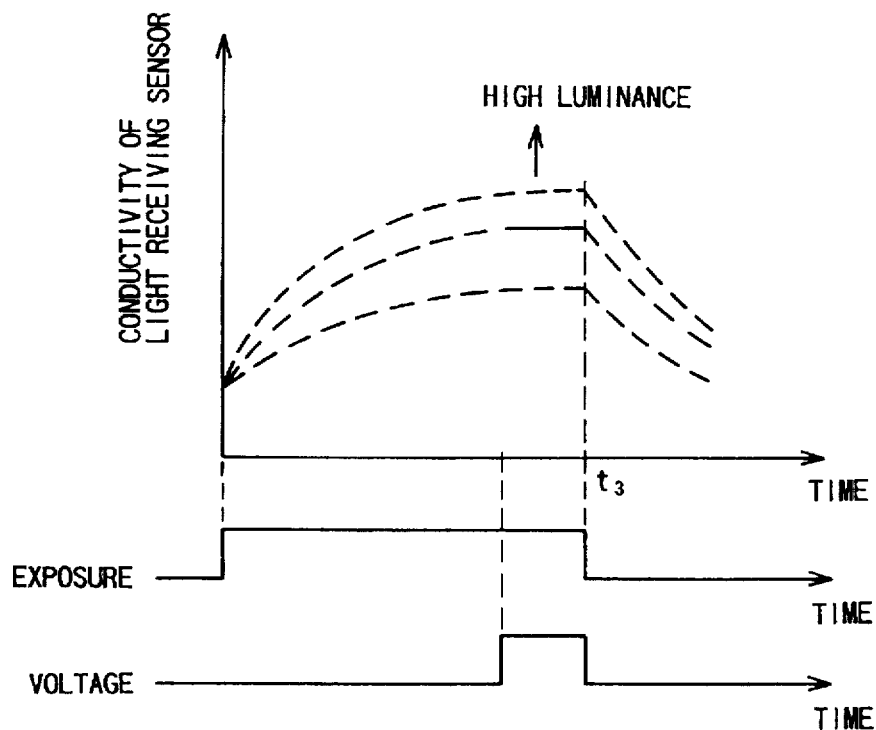
FIG. 19 is a diagram showing a third example of the second embodiment in which the voltage application to the electro-developing recording medium is started after the exposure thereof.

FIG. 19 shows a third example of an operation in which the dynamic range of the electro-developing recording medium 30 is expanded. In this example, the voltage application to the electro-developing recording medium 30 is ended approximately at the same time as the exposure thereof is completed, and the length of time for the voltage application is the same as that of the first example shown in FIG. 15.

As described above, the timing of the exposure and the voltage application of the electro-developing recording medium 30 can be set in accordance with the intention of the photographer of the camera.

Figure 20:
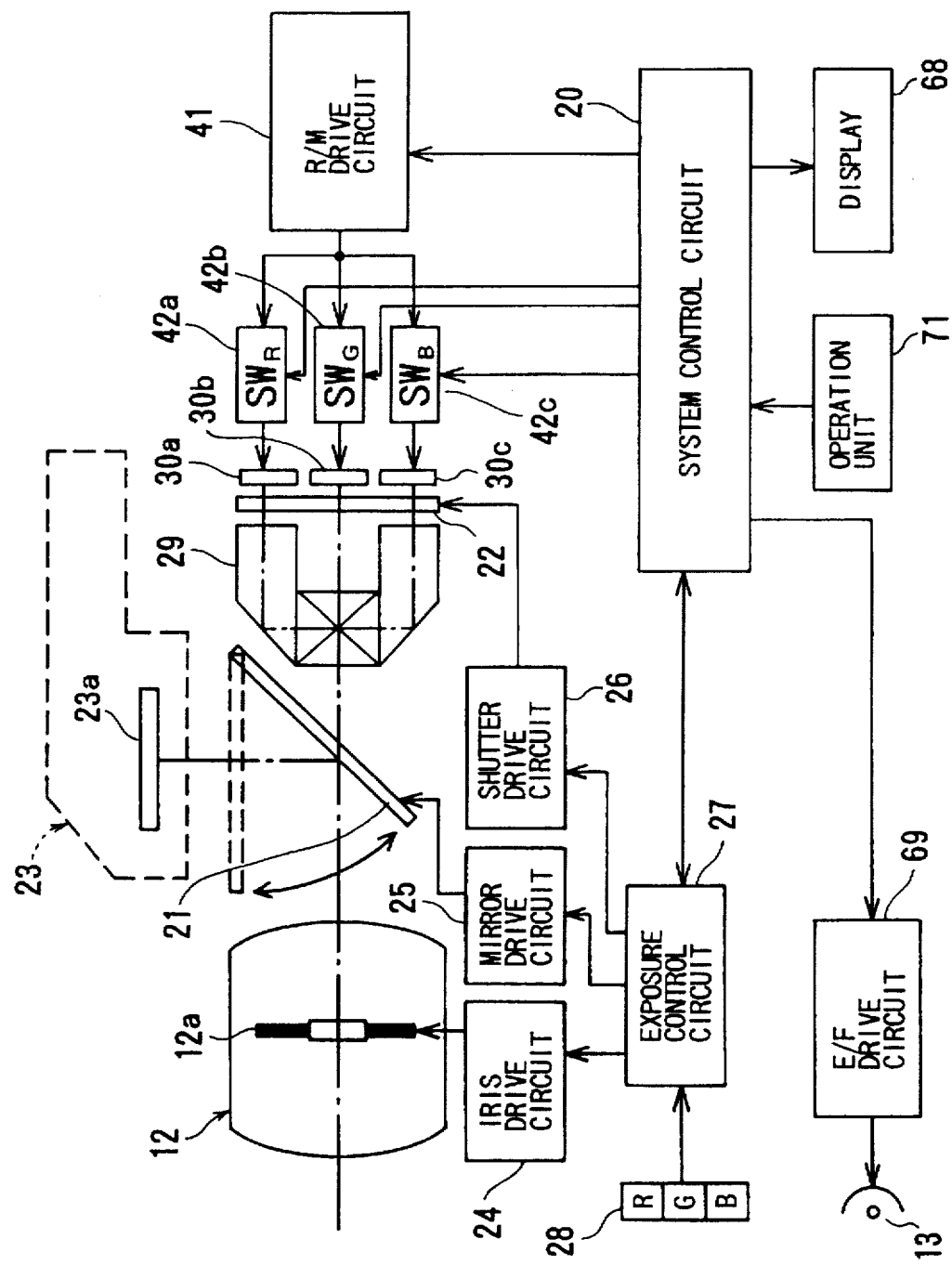
FIG. 20 is a block diagram of the still video camera of the third embodiment.

With reference to FIGS. 20 through 25A and 25B, a third embodiment of the present invention will be described. In the third embodiment, the still video camera has the same external view as the first embodiment shown in FIG. 1, and has electric circuits as shown in FIG. 20.

In the third embodiment, three electro-developing recording mediums 30a, 30b and 30c are disposed behind the photographing optical system 12. A dichroic prism 29 and the shutter 22 are provided between the quick return mirror 21 and the electro-developing recording mediums 30a, 30b and 30c, and the dichroic prism 29 is disposed in front of the shutter 22. Namely, the dichroic prism 29 is disposed in front of the electro-developing recording mediums 30a, 30b and 30c, to lead red (R), green (G) and blue (B) light thereto.

The shutter 22 opens and closes optical paths from three emergent planes of the dichroic prism 29 to the electro-developing recording mediums 30a, 30b and 30c, respectively. The shutter 22 is usually closed, and is opened for a predetermined time by the shutter drive circuit 26 so that light passing through the photographing optical system 12 and the dichroic prism 29 is led to the electro-developing recording mediums 30a, 30b and 30c.

Electric voltage is applied to each of the electro-developing recording mediums 30a, 30b and 30c by the recording medium drive circuit 41. By exposing the electro-developing recording mediums 30a, 30b and 30c while applying the electric voltages thereto, images, which are formed through the photographing optical system 12 and the dichroic prism 29 which correspond to R, G and B components, are developed on the electro-developing recording mediums 30a, 30b and 30c, as described later. Note that the recording medium drive circuit 41 is operated in accordance with a command signal outputted from the system control circuit 20.

A timing at which an electric voltage is applied to each of the electro-developing recording mediums 30a, 30b and 30c is controlled based on an output signal of the photometry sensor 28. The photometry sensor 28 is constructed in such a manner that each of the photometry values for the R, G and B components is sensed. In the system control circuit 20, the time length of the electric voltage application to each of the electro-developing recording mediums 30a, 30b and 30c and the start time of the voltage application are calculated based on the photometry values. Based on the calculation result, three voltage application switches 42a, 42b and 42c are controlled to open and close, so that the voltage application to each of the electro-developing recording mediums 30a, 30b and 30c is controlled. As described later, due to a control of the start time of the voltage application, the sensitivity of each of the electro-developing recording mediums 30a, 30b and 30c is adjusted, so that proper exposures for the R, G and B components are obtained.

An electronic flash drive circuit 69 for controlling the electronic flash 13 is connected to the system control circuit 20.

The other constructions are the same those of the first embodiment.

Figure 21:
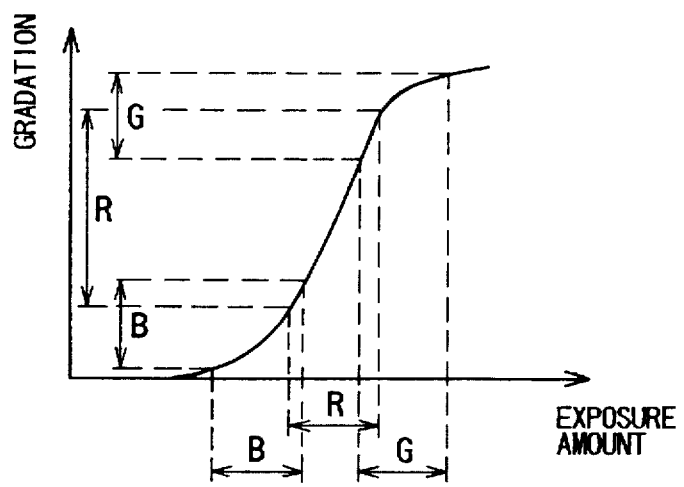
FIG. 21 is a diagram showing a relationship between the exposure amount of the electro-developing recording medium and gradation of luminance of an image formed on the electro-developing recording medium.

FIG. 21 shows a relationship between the exposure amount of the electro-developing recording medium and gradation of luminance of an image formed on the electro-developing recording medium, and in the example shown in FIG. 21, the electric voltage is applied to each of the electro-developing recording mediums 30a, 30b and 30c, simultaneously. Namely, a curve showing the relationship between the exposure amount and the gradation is common with respect to each of the electro-developing recording mediums 30a, 30b and 30c. As shown in this drawing, the gradation of an image corresponding to the R component is not deviated to the lower limit value nor the upper limit value, and exists in a dynamic range of the electro-developing recording medium 30a. Conversely, in the electro-developing recording medium 30b receiving the G component, the gradation of the image is deviated to the upper limit value due to an excessive exposure amount, and in the electro-developing recording medium 30c receiving the B component, the gradation of the image is deviated to the lower limit value due to little exposure amount. If images are developed on the electro-developing recording mediums 30a, 30b and 30c under such a condition, the luminance of the G component is too high and the luminance of the B component is too low, and thus, an image having natural colors is not reproduced on a display device.

In the third embodiment, to obtain an image having natural colors, a sensitivity of the electro-developing recording medium 30b in which the gradation of the image is too high is lowered by advancing the start time of the voltage application in comparison with the other electro-developing recording mediums 30a and 30c. Namely, as described above with reference to FIGS. 7 and 9, if the voltage applications to the electro-developing recording mediums 30a, 30b and 30c are started before the exposure is started, the voltage difference between the bright portions and the dark portions generated in the liquid crystal display 40 becomes relatively small, and thus, the sensitivities of the electro-developing recording mediums 30a, 30b and 30c are lowered. The rate of lowering the sensitivity becomes large, as the timing at which the voltage application is started is advanced with respect to the start of the exposure.

Figure 22:
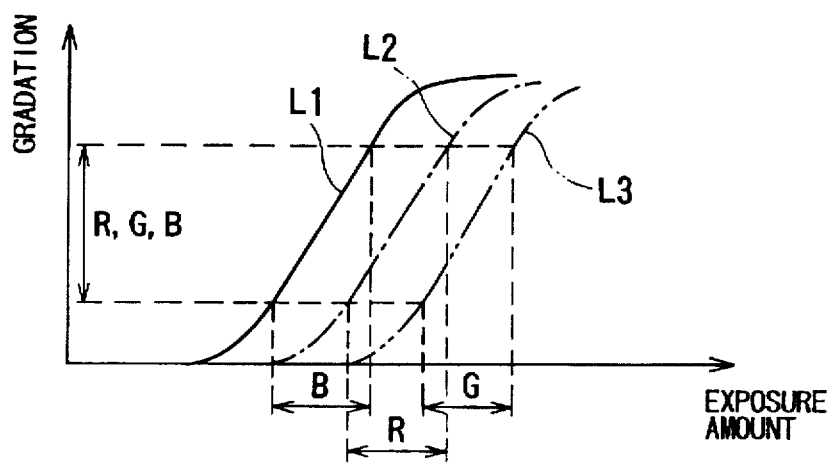
FIG. 22 is a diagram showing a relationship between the exposure amount of the electro-developing recording mediums and the gradation of the luminance of the image developed by the electro-developing recording mediums, when the start timing of the voltage application relative to the start of the exposure is changed.
Figure 23:
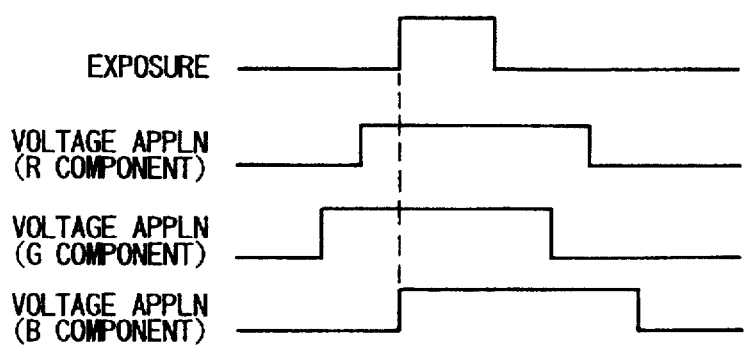
FIG. 23 is a diagram showing a relationship of a timing at which the exposure is performed and the voltage applications to the electro-developing recording mediums are performed.

FIG. 22 shows a relationship between the exposure amount to the electro-developing recording mediums 30a, 30b and 30c and the gradation of the luminance of the image developed by the electro-developing recording mediums 30a, 30b and 30c, when the start timing of the voltage application relative to the start of the exposure is changed. FIG. 23 shows a relationship of a timing at which the exposure is performed and the voltage applications to the electro-developing recording mediums 30a, 30b and 30c are performed. As shown in FIG. 23, the voltage application periods of the electro-developing recording mediums 30a, 30b and 30c are equal to each other, and the voltage application to each of the electro-developing recording mediums 30a, 30b and 30c is completed after the exposure is completed.

As shown in FIGS. 22 and 23, regarding the B component, the voltage application to the electro-developing recording medium 30c is started when the exposure is started, and a relationship between the exposure amount and the gradation of the image is shown by a solid line L1 in FIG. 22. Regarding the R component, the voltage application to the electro-developing recording medium 30a is started earlier than that of the B component, and a chain line L2 showing a relationship between the exposure amount and the gradation of the image is shifted to the side in which the exposure amount is relatively large. Regarding the G component, the voltage application to the electro-developing recording medium 30b is started earlier than that of the R component, and a chain double-dashed line L3 showing a relationship between the exposure amount and the gradation of the image is shifted to the side in which the exposure amount is relatively large, in comparison with the chain line L2.

As understood from the comparison of FIGS. 21 and 22, regarding the R and G components, since the start timing of the voltage application is advanced compared to that of the B component, the exposure amount required for obtaining the same gradation is increased, and namely, the sensitivity is lowered. Thus, regarding the R, G and B components, the gradation of each of the images becomes the same, so that a proper exposure is obtained in each of the electro-developing recording mediums 30a, 30b and 30c even if the intensity of light of each color component is different due to the characteristics of the light illuminating the object to be photographed, for example. Further, since the sensitivity of each of the electro-developing recording mediums 30a, 30b and 30c is lowered in the order corresponding to the electro-developing recording medium which corresponds to a color component the amount of which is larger than the other color components, each of the object color images is recorded in the electro-developing recording mediums in a state in which the white balance is optically adjusted.

Figure 24:
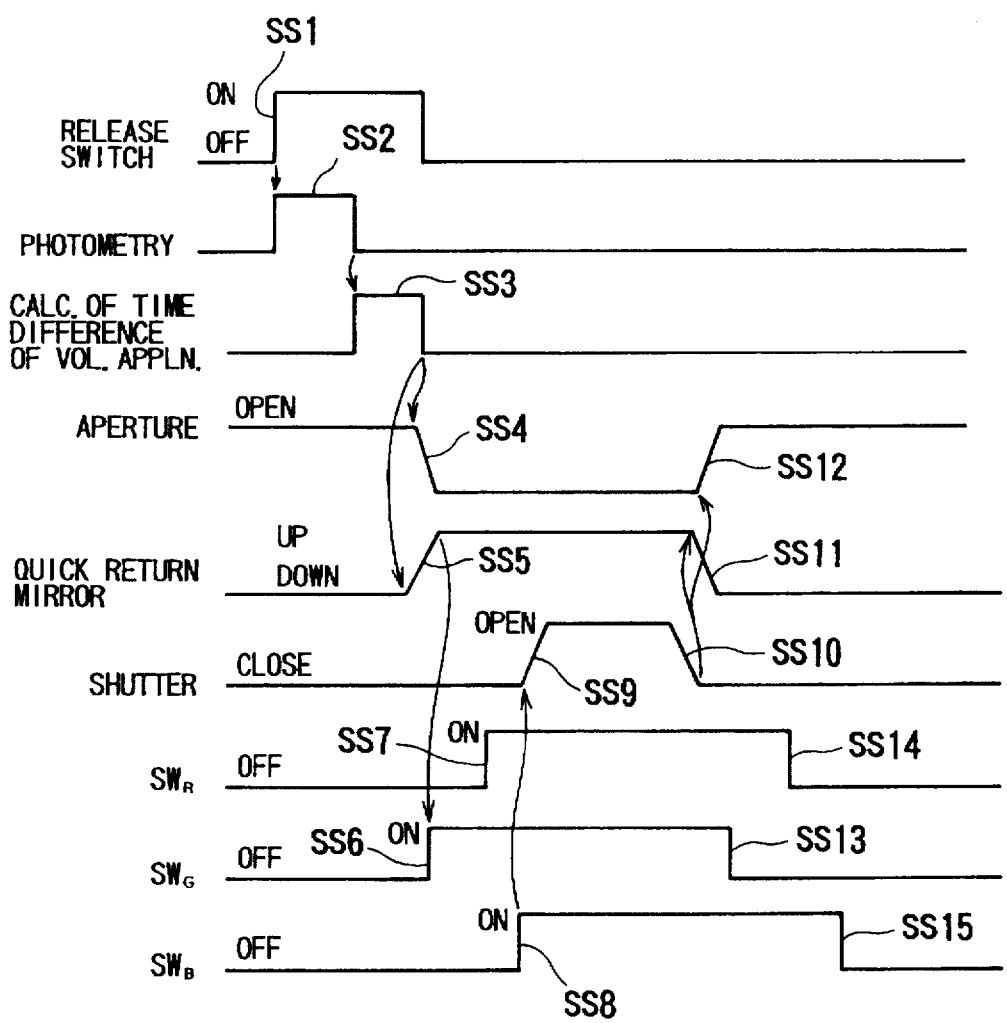
FIG. 24 is a timing chart of the photographing operation in the third embodiment.
Figure 25A:
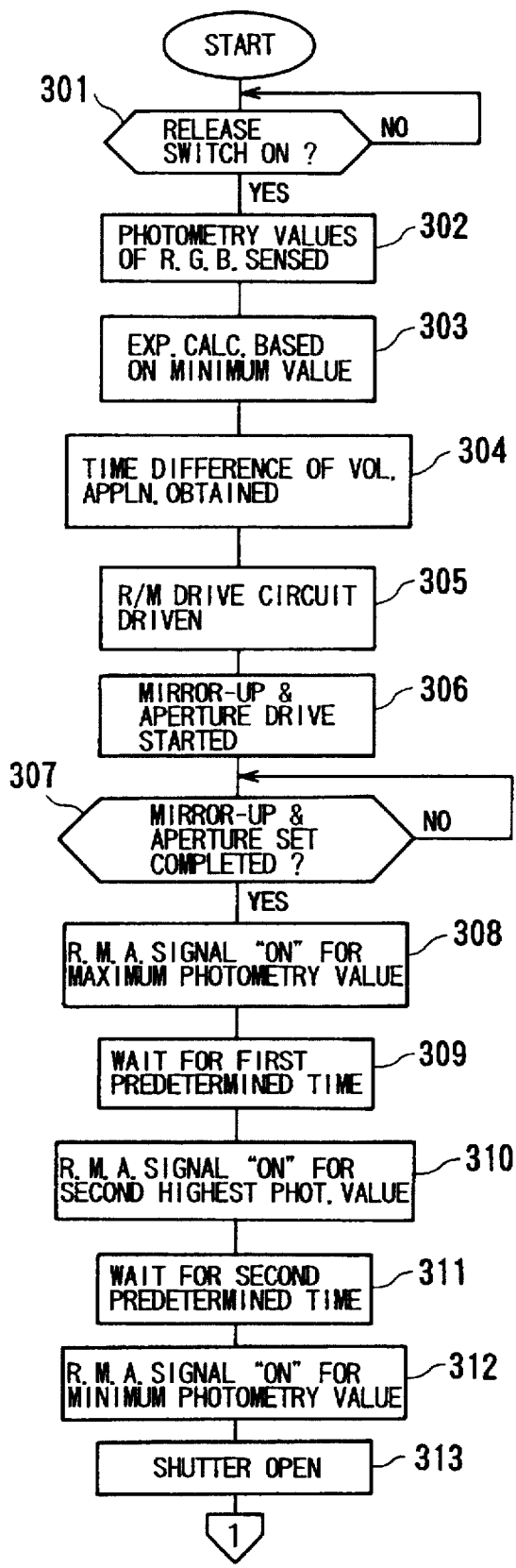
FIGS. 25A and 25B are flow charts of the photographing operation in the third embodiment.
Figure 25B:
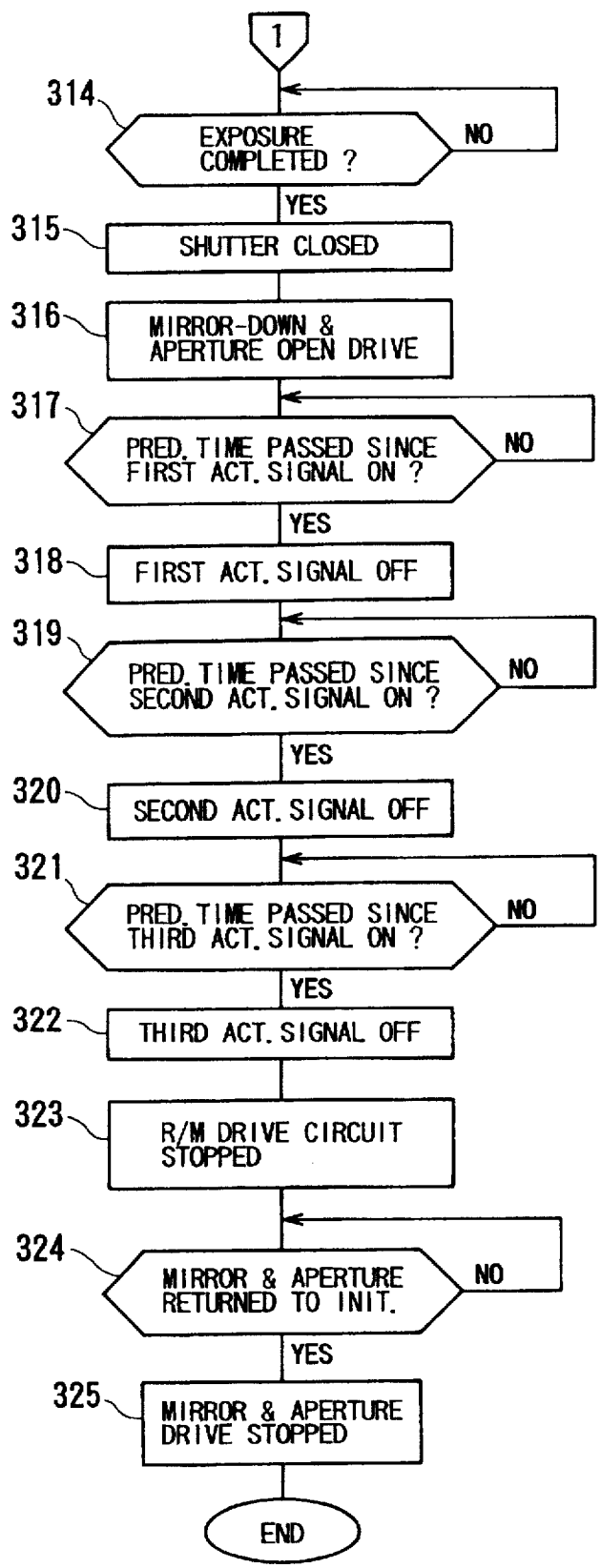

FIG. 24 is a timing chart of the photographing operation, and FIGS. 25A and 25B show a flow chart of the photographing operation. With reference to these drawings, operation of the third embodiment will be described.

When it is sensed in Step 301 that the release switch 14 is turned ON (reference SS1), output signals of the photometry sensor 28, i.e., photometry values of R, G and B components, are sensed in Step 302 (reference SS2). In Step 303, an exposure calculation is performed based on the minimum value among the photometry values of the R, G and B components. In the example shown in FIGS. 22 and 23, the photometry value of the B component shows the minimum value, and therefore, the exposure calculation is performed based on the photometry value of the B component, so that the opening degree of the aperture 12a and the shutter speed (exposure time) are obtained.

In Step 304, time differences, by which the voltage applications to the electro-developing recording mediums 30a, 30b and 30c should be started, are obtained based on the differences of the photometry values of the R, G and B components (reference SS3), so that first and second predetermined times used in Steps 309 and 311 are obtained. Note that the relationship between the photometry difference and the time difference of the voltage application is obtained by an experiment, for example, and is stored in a memory provided in the system control circuit 20.

In Step 305, the recording medium drive circuit 41 is driven, so that supply of an electric power of the circuit 41 is started. In Step 306, the opening degree of the aperture 12a is changed from the fully open state to a predetermined opening degree (reference SS4), and the quick return mirror 21 is changed from the down condition to the up-condition (reference SS5). When it is confirmed in Step 307 that the quick return mirror 21 has been changed to the up-condition and the opening degree adjustment of the aperture 12a has been completed, the photographing operations of the electro-developing recording mediums 30a, 30b and 30c are performed in Step 308 and the following Steps.

In Step 308, the recording medium activating signal of the electro-developing recording medium corresponding to the color component in which the photometry value has the maximum value is set to the ON-condition, so that the voltage application switch 42a, 42b or 42c corresponding to the electro-developing recording medium is closed. This recording medium activating signal is referred to as a first activating signal hereinafter. In the example shown in FIGS. 22 and 23, the voltage application switch 42b of the electro-developing recording medium 30b corresponding to the G component is closed (reference SS6), so that a voltage application to the electro-developing recording medium 30b is started. In Step 309, a waiting time for the first predetermined time obtained in Step 304 is provided, so that the process waits for the first predetermined time since the voltage application switch was closed in Step 308.

In Step 310, the recording medium activating signal of the electro-developing recording medium corresponding to the color component in which the photometry value has the second highest value is set to the ON-condition, so that the voltage application switch 42a, 42b or 42c corresponding to the electro-developing recording medium is closed. This recording medium activating signal is referred to as a second activating signal hereinafter. In the example shown in FIGS. 22 and 23, the voltage application switch 42a of the electro-developing recording medium 30a corresponding to the R component is closed (reference SS7), so that a voltage application to the electro-developing recording medium 30a is started. In Step 311, a waiting time for the second predetermined time obtained in Step 304 is provided, so that the process waits for the second predetermined time since the voltage application switch was closed in Step 308.

In Step 312, the recording medium activating signal of the electro-developing recording medium to which a voltage has not been applied is set to the ON-condition, so that the voltage application switch 42a, 42b or 42c corresponding to the electro-developing recording medium is closed. Namely, the electro-developing recording medium corresponds to a color component in which the photometry value has the minimum value. This recording medium activating signal is referred to as a third activating signal hereinafter. In the example shown in FIGS. 22 and 23, the voltage application switch 42c of the electro-developing recording medium 30c corresponding to the B component is closed (reference SS8), so that a voltage application to the electro-developing recording medium 30c is started.

In Step 313, the shutter 22 is opened (reference SS9). In Step 314, it is determined whether the exposure time obtained in Step 303 has passed since the shutter 22 has opened. When the exposure time has passed, the shutter 22 is closed in Step 315 (reference SS10), and the mirror 21 is changed to the down-condition (reference SS11) and the aperture 12a is driven to the fully open condition (reference SS12), in Step 316.

In Step 317, it is determined whether a predetermined time has passed since the first activating signal was set to the ON-condition. When the predetermined time has passed, the first activating signal is changed to the OFF-condition in Step 318, so that the voltage application switch 42b is opened (reference SS13). In Step 319, it is determined whether the predetermined time has passed since the second activating signal was set to the ON-condition. When the predetermined time has passed, the second activating signal is changed to the OFF-condition in Step 320, so that the voltage application switch 42a is opened (reference SS14). In Step 321, it is determined whether the predetermined time has passed since the third activating signal was set to the ON-condition. When the predetermined time has passed, the third activating signal is changed to the OFF-condition in Step 322, so that the voltage application switch 42c is opened (reference SS15).

In Step 323, the recording medium drive circuit 41 is stopped. Then, when it is confirmed in Step 324 that the mirror 21 and the aperture 12a have returned to the initial conditions, respectively, the operations of the mirror 21 and the aperture 12a are stopped in Step 325, and thus, this photographing operation program ends.

As described above, the third embodiment is constructed in such a manner that the voltage application to the electro-developing recording medium corresponding to the color component having a high photometry value is started earlier than the voltage application to the electro-developing recording medium corresponding to a color component having a low photometry value, whereby the sensitivity of the former electro-developing recording medium is lowered, and thus, the gradation of the image of each of color components can be uniform. Therefore, in comparison with a construction in which the voltage applications to all of the electro-developing recording mediums are started at the same time, proper exposures are obtained for all of the electro-developing recording mediums, even if the intensities of light of the color components are different from each other due to the characteristics of the light illuminating the object to be photographed, and thus, when an image is reproduced by a display device, for example, an image having natural colors is obtained.

Figure 26:
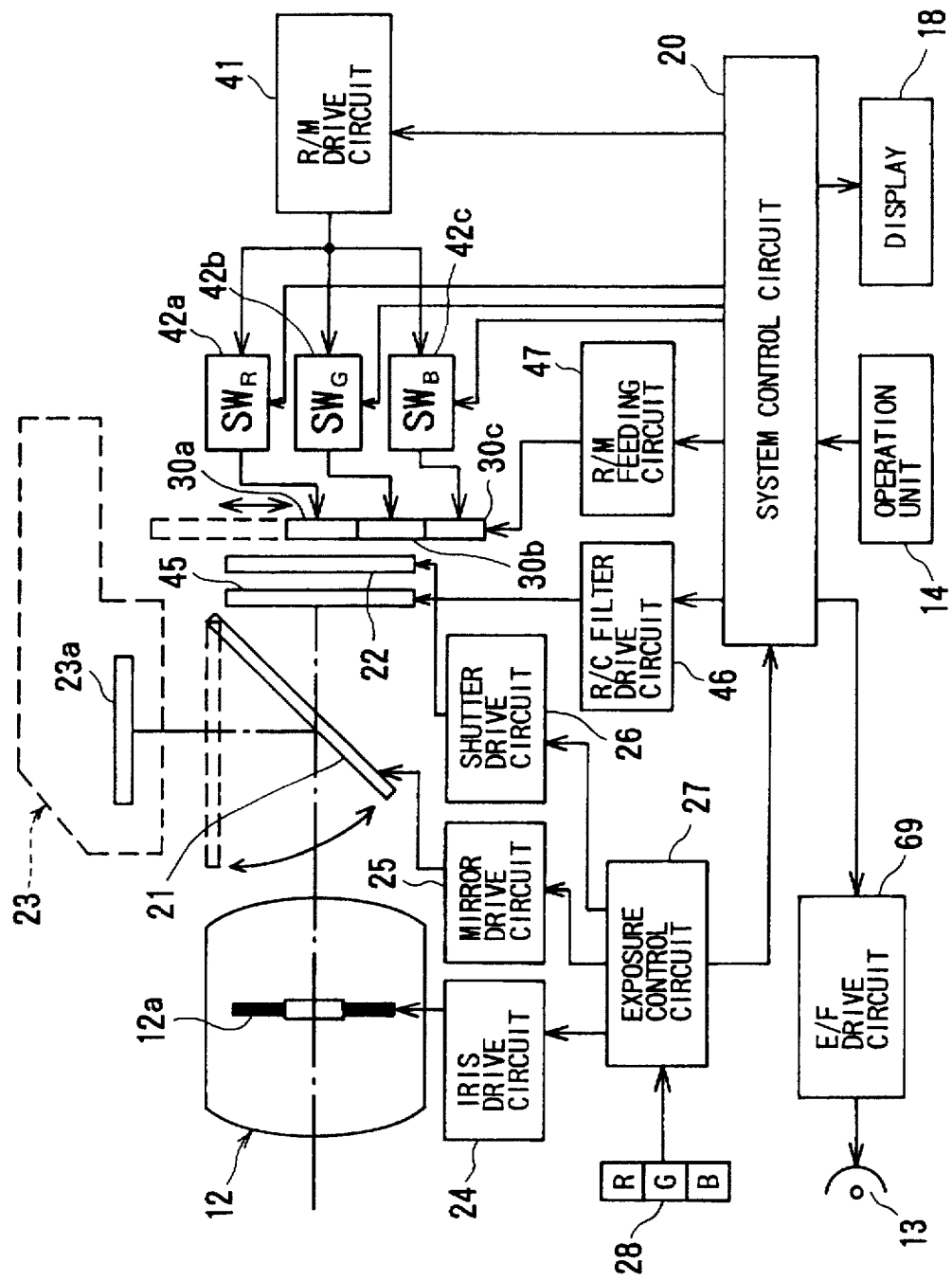
FIG. 26 is a block diagram of the still video camera to which the fourth embodiment of the present invention is applied.

FIG. 26 is a block diagram of the still video camera to which a fourth embodiment of the present invention is applied. The different points from the third embodiment are that a rotational color filter 45 is provided instead of the dichroic prism 29 and the three electro-developing recording mediums 30a, 30b and 30c are connected to each other in one body. The other constructions are the same as those of the third embodiment.

Figure 27:
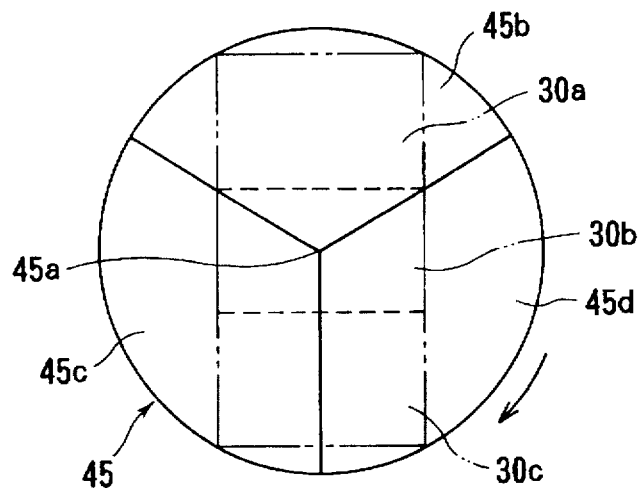
FIG. 27 is a front view showing a rotational color filter.

The rotational color filter 45 is provided between the quick return mirror 21 and the shutter 22. The rotational filter 45 is a circular disk as shown by FIG. 27, and is divided into an R filter element 45b, a G filter element 45c and a B filter element 45d by three straight lines passing through a rotation center 45a. The rotational color filter 45 is rotated about the rotation center 45a by a rotational color filter drive circuit 46.

The electro-developing recording mediums 30a, 30b and 30c are disposed behind the shutter 22, namely at the opposite side of the rotational color filter 45, and the three electro-developing recording mediums 30a, 30b and 30c are connected to each other along the vertical direction as shown in FIG. 27. The electro-developing recording mediums 30a, 30b and 30c can be moved in the vertical direction by a recording medium feeding circuit 47. For example, when the R filter element 45b is positioned at the up position, the electro-developing recording medium 30a is positioned behind the R filter element 45b, and under this condition, an image corresponding to the R component is formed and developed on the electro-developing recording medium 30a.

Figure 28:
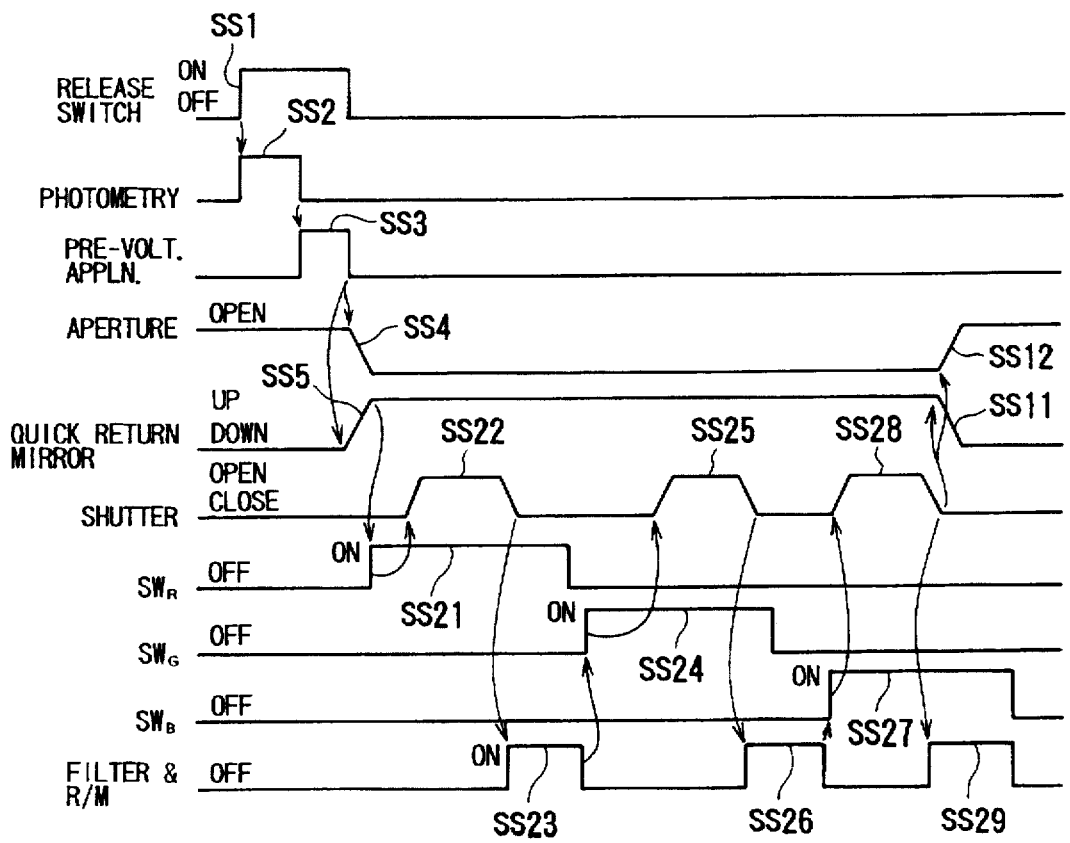
FIG. 28 is a timing chart of the photographing operation in the fourth embodiment.
Figure 29A:
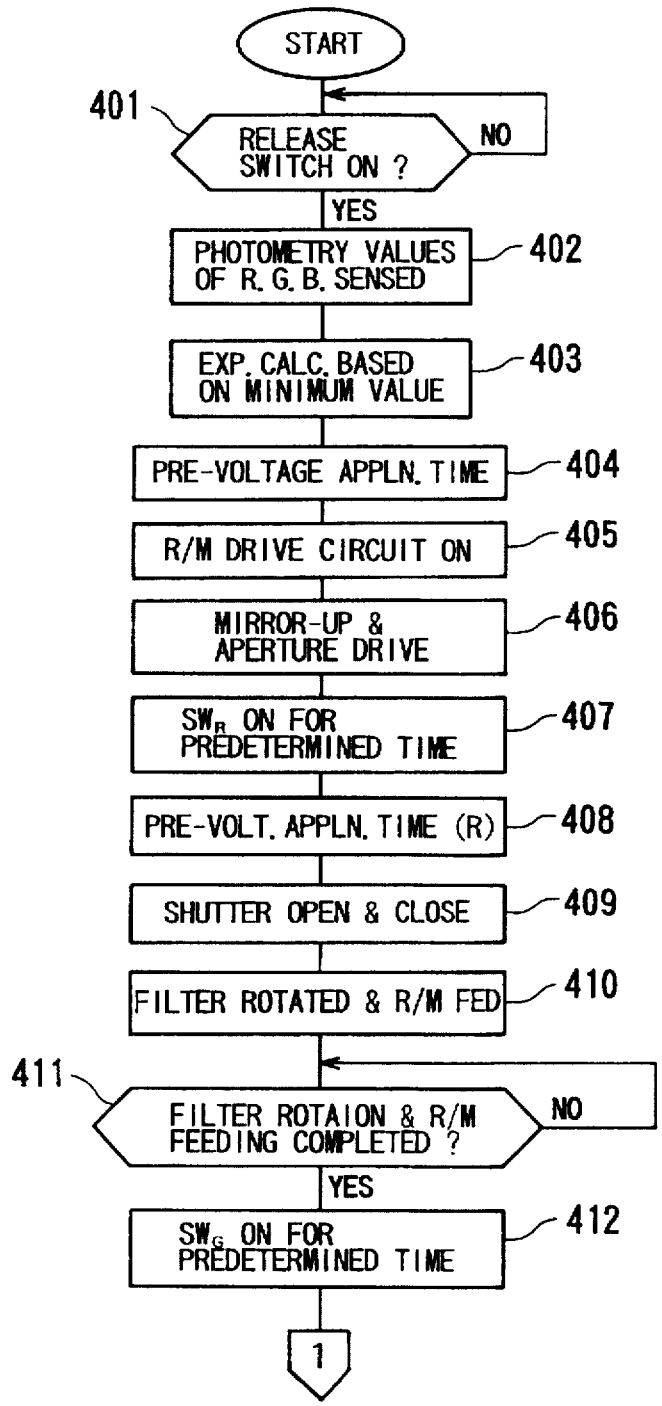
FIGS. 29A and 29B are flow charts of the photographing operation in the fourth embodiment.
Figure 29B:
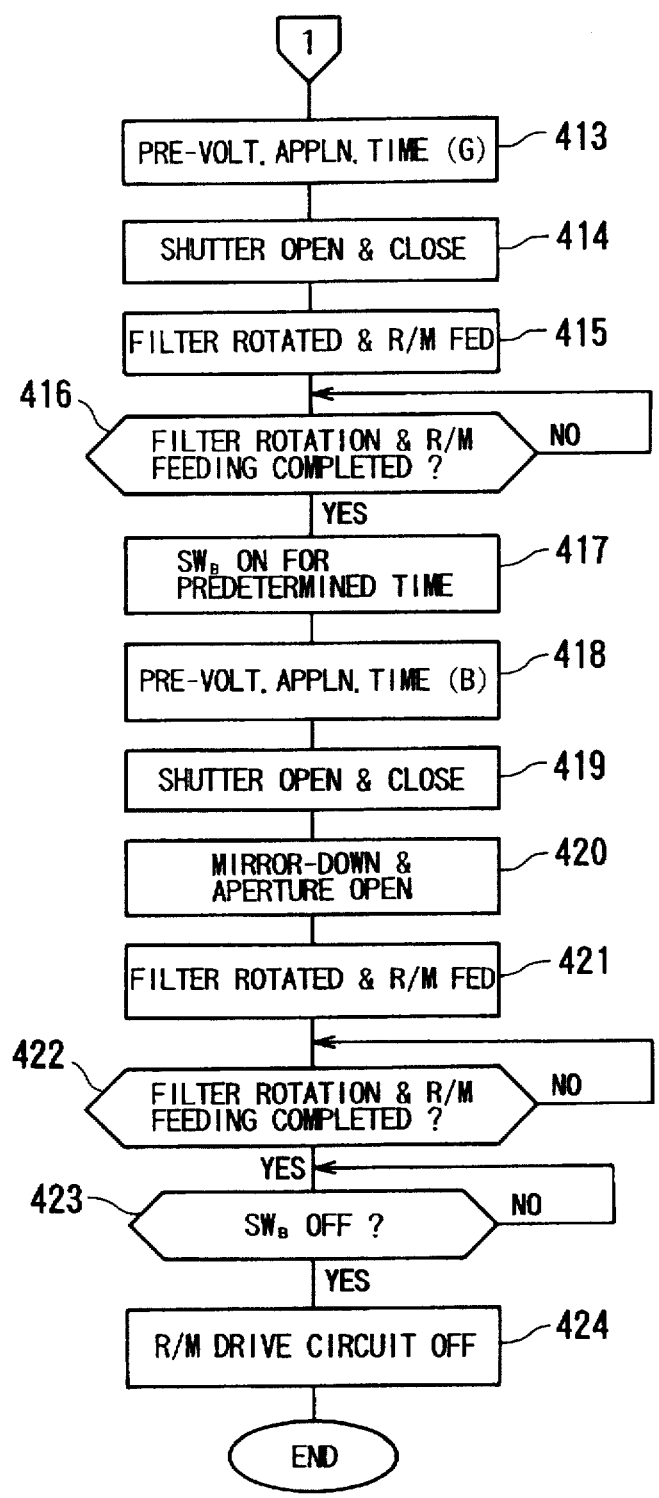

FIG. 28 is a timing chart of the photographing operation, and FIGS. 29A and 29B show a flow chart of the photographing operation. With reference to these drawings, operation of the fourth embodiment will be described. Note that, in FIG. 28, an operation in which the same operation is performed as in FIG. 24 is indicated by the same reference as FIG. 24. Further, in the following description, it is supposed that light illuminating an object to be photographed has a low color temperature and inclines in red.

When it is sensed in Step 401 that the release switch 14 is turned ON (reference SS1), output signals of the photometry sensor 28, i.e., photometry values of R, G and B components, are sensed in Step 402 (reference SS2). In Step 403, an exposure calculation is performed based on the minimum value among the photometry values of the R, G and B components, so that the opening degree of the aperture 12a and the shutter speed (exposure time) are obtained. In Step 404, based on the differences among the photometry values of R, G and B, prevoltage application times, i.e., differences from times when the voltage applications to the electro-developing recording mediums are started to a time when the exposure is started (reference SS3), are calculated for the electro-developing recording mediums 30a, 30b and 30c, respectively. Note that the pre-voltage application times are obtained by experiment, for example, and are stored in a memory provided in the system control circuit 20, similarly to the third embodiment.

In Step 405, the recording medium drive circuit 41 is driven, so that a supply of electric power of the circuit 41 is started. In Step 406, the opening degree of the aperture 12a is changed from the fully open state to a predetermined opening degree (reference SS4), and the quick return mirror 21 is changed from the down condition to the up-condition (reference SS5). Note that, as initial conditions of the rotational color filter 45 and the electro-developing recording mediums 30a, 30b and 30c, the R filter element 45b is set to the up position, and the electro-developing recording medium 30a on which the R component image is developed is disposed behind the R filter element 45b.

In Step 407, the voltage application switch 42a corresponding to the R component is set to ON-condition. The ON-condition is continued for a predetermined time (reference SS21), during which Steps 408 and 409 are executed. In Step 408, a waiting time is provided so that the process waits until when the pre-voltage application time for the R component obtained in Step 404 has passed since the change of the voltage application switch 42a to the ON-condition in Step 404. When the pre-voltage application time has passed, Step 409 is executed, so that the shutter 22 is opened for the exposure time obtained in Step 403 (reference SS22). Thus, an image corresponding to the R component is developed on the electro-developing recording medium 30a.

After the shutter 22 has been closed, the rotational color filter 45 is rotated, and the electro-developing recording mediums 30a, 30b and 30c are fed in the vertical direction in Step 410 (reference SS23). When it is confirmed in Step 411 that the rotational color filter 45 has been rotated by approximately 120 degrees and the feeding of the electro-developing recording mediums 30a, 30b and 30c has been completed so that the electro-developing recording medium 30b on which the G component image should be developed is positioned behind the G filter element 45c, Steps 412 through 414 are executed so that the G image is obtained.

Namely, in Step 412, the voltage application switch 42b corresponding to the G component is set to the ON-condition, and while the ON-condition is continued for a predetermined time (reference SS24), a waiting time until the pre-voltage application time of the G component has passed is provided in Step 413. After the pre-voltage application time has passed, Step 414 is executed, so that the shutter 22 is opened for the exposure time obtained in Step 403 (reference SS25). Thus, an image corresponding to the G component is developed on the electro-developing recording medium 30b.

Then, a B component image is developed in similar way as described above. Namely, in Step 415, the rotational color filter 45 is rotated, and the electro-developing recording mediums 30a, 30b and 30c are fed in the vertical direction in Step 415 (reference SS26). When it is confirmed in Step 416 that the rotational color filter 45 has been rotated by approximately 120 degrees and the feeding of the electro-developing recording mediums 30a, 30b and 30c has been completed so that the electro-developing recording medium 30c on which the B component image should be developed is positioned behind the B filter element 45d, Steps 417 through 419 are executed so that the B image is obtained.

Namely, in Step 417, the voltage application switch 42c corresponding to the B component is set to the ON-condition, and while the ON-condition is continued for a predetermined time (reference SS27), a waiting time until the pre-voltage application time of the B component has passed is provided in Step 418. After the pre-voltage application time has passed, Step 419 is executed, so that the shutter 22 is opened for the exposure time obtained in Step 403 (reference SS28). Thus, an image corresponding to the B component is developed on the electro-developing recording medium 30c.

When the development of the B image is completed and the shutter 22 is closed, the quick return mirror 21 is changed to the down condition (reference SS11) and the aperture 12a is fully opened (reference SS12), in Step 420. In Step 421, the rotational color filter 45 is rotated and the electro-developing recording mediums 30a, 30b and 30c are fed to the initial positions, respectively (reference SS29). When it is confirmed in Step 422 that the rotational color filter 45 and the electro-developing recording mediums 30a, 30b and 30c are returned to the initial positions, respectively, and when it is confirmed in Step 423 that the voltage application switch 42b corresponding to the B component has been changed to the OFF-condition, the recording medium drive circuit 41 is turned OFF in Step 424, and thus the photographing operation program is ended.

According to the fourth embodiment, the same effect as that of the third embodiment is obtained.

Note that the electro-developing recording medium 30 is not restricted to the structure described above, and may be any other structure by which an image is electronically developed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-152602 (filed on May 26, 1995), No. 7-152603 (filed on May 26, 1995), No. 7-159806 (filed on Jun. 2, 1995), No. 8-114230 (filed on Apr. 11, 1996), No. 8-114231 (filed on Apr. 11, 1996) and No. 8-114232 (filed on Apr. 11, 1996) which are expressly incorporated herein, by reference, in their entirety.

We claim:

1. A device for controlling a developing operation of an electro-developing type camera, comprising:
    an electro-developing recording medium in which an image formed thereon is electronically developed;
    means for exposing said electro-developing recording medium to form said image;
    means for applying a voltage to said recording medium so that said image is developed by said recording medium; and
    means for activating said exposing means and said applying means such that an exposure of said exposing means is started after a voltage application of said applying means is started, said voltage application ending before said exposure is ended.

2. A control device according to claim 1, wherein said recording medium comprises an electrostatic information recording medium that generating an electric charge in accordance with an image formed thereon, and an electric charge keeping medium which generates a visible image in accordance with said electric charge and which can keep said visible image.

3. A control device according to claim 2, wherein said electric charge keeping medium is a liquid crystal display having a memory-type liquid crystal.

4. A control device according to claim 1, wherein said exposure is performed for a predetermined constant time, and an aperture value is set based on said time.

5. A device for controlling a developing operation of an electro-developing type camera, comprising:
    an electro-developing recording medium in which an image formed thereon is electronically developed;
    means for exposing said electro-developing recording medium to form said image;
    means for applying a voltage to said recording medium so that said image is developed by said recording medium; and
    means for activating said exposing means and said applying means such that an exposure of said exposing means is started after a voltage application of said applying means, said electro-developing recording medium comprising a plurality of recording areas by which a plurality of primary color images corresponding to an object image photographed by said electro-developing type camera are developed, respectively, said activating means activating said exposing means and said applying means in such a manner that said exposure and said voltage application are performed at a different timing for each of said plurality of recording areas.

6. A control device according to claim 5, wherein said voltage application is started before said exposure is started for each of said plurality of recording areas.

7. A control device according to claim 6, wherein a voltage application in one of said recording areas is started before a voltage application in the other of said recording areas is started.

8. A control device according to claim 5, wherein said voltage application is performed for a same period for each of said recording areas.

9. A control device according to claim 5, wherein said voltage application is ended after said exposure is ended in each of said recording areas.

10. A control device according to claim 5, wherein said voltage application in one of said recording areas is started at approximately a same time when said exposure is started.

11. A control device according to claim 5, further comprising a dichroic optical member facing said electro-developing recording medium, said dichroic optical member leading red, green and blue light beams to said recording areas, respectively.

12. A control device according to claim 11, further comprising a color filter facing said electro-developing recording medium and having red, green and blue filter elements, and means for positioning said electro-developing recording medium in such a manner that one of said recording areas is positioned to face one of said filter elements.

13. A control device according to claim 12, wherein said color filter is a rotational color filter rotatably supported at a center thereof.

14. A device for controlling a developing operation of an electro-developing type camera, comprising:
    an electro-developing recording medium in which an image formed thereon is electronically formed;
    means for exposing said electro-developing recording medium to form said image;
    means for applying a voltage to said electro-developing recording medium so that said image is developed by said electro-developing recording medium; and
    means for activating said exposing means and said applying means such that an exposure of said exposing means is started after a voltage application of said applying means is started, said voltage application ending prior to an ending of said exposure.

15. A device for controlling a developing operation of an electro-developing type camera, comprising:
    an electro-developing recording medium in which an image formed thereon is electronically developed;
    means for exposing said electro-developing recording medium to form said image;
    means for applying a voltage to said electro-developing recording medium so that said image is developed by said electro-developing recording medium; and
    means for activating said exposing means and said applying means such that a voltage application is started after an exposure of said exposing means is started, said voltage application ending at substantially the same time that said exposure ends.

16. A device for controlling a developing operation of an electro-developing type camera, comprising:
    a plurality of electro-developing recording mediums in which a plurality of primary colors formed thereon are electronically developed;

means for exposing said plurality of electro-developing recording mediums to form said primary color images;

means for applying a voltage to each of said plurality of electro-developing recording mediums so that said primary color images are developed by said electro-developing recording mediums; and means for activating said exposing means and said applying means such that a voltage application of each of said plurality of electro-developing recording mediums is started before an exposure of each of said plurality of electro-developing recording mediums is started, said voltage application being performed at a predetermined timing for each of said plurality of electro-developing recording mediums.

17. The control device according to claim 16, wherein said voltage application is applied to each of said plurality of electro-developing recording mediums for a same period of time.

18. The control device according to claim 16, wherein said predetermined timing comprises different timings for each of said plurality of electro-developing recording mediums.

* * * * *